(12) United States Patent
Balachandran et al.

(10) Patent No.: US 12,717,032 B1
(45) Date of Patent: Aug. 25, 2026

(54) ITERATIVE TARGET DETECTION WITH RETRO-REFLECTION REDUCTION IN COHERENT SENSING DEVICES

(71) Applicant: Waymo LLC, Mountain View, CA (US)

(72) Inventors: Ganesh Balachandran, Mountain View, CA (US); Alexander Yukio Piggott, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 868 days.

(21) Appl. No.: 18/091,775

(22) Filed: Dec. 30, 2022

(51) Int. Cl.

| | |
|---|---|
| ***G01S 17/36*** | (2006.01) |
| ***G01S 7/4912*** | (2020.01) |
| ***G01S 7/493*** | (2006.01) |
| ***G01S 17/58*** | (2006.01) |

(52) U.S. Cl.
CPC ............ *G01S 17/36* (2013.01); *G01S 7/4917* (2013.01); *G01S 7/493* (2013.01); *G01S 17/58* (2013.01)

(58) Field of Classification Search
USPC ............................................................ 356/5.1
See application file for complete search history.

(56) References Cited

U.S. PATENT DOCUMENTS

| | | | |
|---|---|---|---|
| 8,112,223 B2 | 2/2012 | Jordan | |
| 8,836,922 B1 | 9/2014 | Pennecot | |
| 9,513,497 B2 | 12/2016 | Guzzon | |
| 9,851,470 B2 | 12/2017 | Henderson | |
| 10,012,723 B2 | 7/2018 | Lindskog | |
| 10,422,880 B2 | 9/2019 | Crouch | |
| 10,436,906 B2 | 10/2019 | Droz | |
| 10,686,523 B1 | 6/2020 | Gleason | |
| 10,914,841 B2 | 2/2021 | Crouch | |
| 10,928,485 B1 * | 2/2021 | Karadeniz | G01S 17/10 |
| 11,112,503 B2 | 9/2021 | Fried | |
| 11,448,766 B2 | 9/2022 | Sutherland | |
| 12,061,249 B1 | 8/2024 | Loui | |

(Continued)

OTHER PUBLICATIONS

Zhu H., et al., "On-Chip Optical Power Monitor Using Periodically Interleaved P-N Junctions Integrated on a Silicon Waveguide," IEEE Journal of Selected Topics in Quantum Electronics, Jul./Aug. 2014, vol. 20(4), 8 Pages.

(Continued)

*Primary Examiner* — Yuqing Xiao
*Assistant Examiner* — Clint Thatcher
(74) *Attorney, Agent, or Firm* — Christensen O'Connor Johnson Kindness PLLC

(57) ABSTRACT

The subject matter of this specification can be implemented in, among other things, systems and methods of optical sensing that use destructive interference to suppress retro-reflected light during generation of sensing beams. Described, among other things, is a system that outputs a modulated transmitted (TX) beam and collects a received (RX) beam having one or more beams reflected from outside object(s). The system obtains, using the RX beam, a first phase information (PI) that includes a first feature and a second feature. The system obtains, using a copy of the modulated TX beam, a second PI, and reduces, using the second PI, the first feature of the first PI. The system then determines, using the second feature of the first PI, one or more characteristics of the outside object(s).

20 Claims, 7 Drawing Sheets

(56) References Cited

U.S. PATENT DOCUMENTS

| | | | | |
|---|---|---|---|---|
| 2002/0159128 | A1 | 10/2002 | Green | |
| 2010/0001744 | A1 | 1/2010 | Hirayama | |
| 2010/0020306 | A1 | 1/2010 | Hall | |
| 2014/0254972 | A1 | 9/2014 | Fujino | |
| 2016/0282468 | A1 | 9/2016 | Gruver | |
| 2018/0128974 | A1 | 5/2018 | Iida | |
| 2018/0372951 | A1 | 12/2018 | Hashiya | |
| 2019/0361122 | A1 | 11/2019 | Crouch | |
| 2019/0391243 | A1 | 12/2019 | Nicolaescu | |
| 2020/0150251 | A1 * | 5/2020 | Crouch | G01S 7/4814 |
| 2020/0249351 | A1 | 8/2020 | Chen | |
| 2020/0256958 | A1 | 8/2020 | Piggott | |
| 2020/0408882 | A1 | 12/2020 | Gassend | |
| 2021/0372923 | A1 * | 12/2021 | Son | G01S 17/931 |
| 2021/0382142 | A1 | 12/2021 | Rogers | |
| 2021/0405290 | A1 | 12/2021 | Hayenga | |
| 2022/0381889 | A1 * | 12/2022 | Satyan | G01S 17/931 |
| 2023/0027271 | A1 | 1/2023 | Jin | |
| 2023/0039691 | A1 * | 2/2023 | Remesch | B60W 30/09 |
| 2025/0013081 | A1 | 1/2025 | Menard | |
| 2025/0116763 | A1 * | 4/2025 | Spollard | G01C 21/3602 |

OTHER PUBLICATIONS

Aalto T., et al., "Open-Access 3-um SOI Waveguide Platform for Dense Photonic Integrated Circuits," In IEEE Journal of Selected Topics in Quantum Electronics, Sep./Oct. 2019, vol. 25, No. 5, pp. 1-9.

Aeye Idar: "iDAR is Smarter than LiDAR," aeye. ailidar/, 11 Pages, [Retrieved on Oct. 20, 2020].

Aurora, "FMCW Lidar: The Self-Driving Game-Changer," Apr. 9, 2020, 6 Pages, [Retrieved on Oct. 20, 2020] Retrieved from URL: medium.com/aurora-blog/fmcw-lidar-the-self-driving-game-changer-194fd311fd0e9.

Chung S.W, et al., "Low-Power Thermo-Optic Silicon Modulator for Large-Scale Photonic Integrated Systems," Optics Express, Apr. 29, 2019, vol. 27, No. 9, pp. 13430-13459, 30 Pages.

Cook E.H., et al., "Polysilicon Grating Switches for LiDAR," Journal of Microelectromechanical Systems, Oct. 2020, vol. 29, No. 5, pp. 1008-1013.

Dickson L.D., et al., "Holographic Polarization-Separation Elements," Applied Optics, Record ID.: R066440, Aug. 10, 1994, vol. 33 (23), pp. 5378-5385.

Gajda A., et al., "Design Rules for p-i-n Diode Carriers Sweeping in Nano-Rib Waveguides on SOI," Optics Express, May 5, 2011, vol. 19, No. 10, pp. 9915-9922.

greencarcongress.com: "Aeva Announces Aeries 4D FMCW Lidar-on-Chip for Autonomous Driving; Recent Porsche Investment," Dec. 12, 2019, 11 Pages, Retrieved from URL: https://www.greencarcongress.com/2019/12/20191212.aeva.html.

Inoue D., et al., "Demonstration of a New Optical Scanner Using Silicon Photonics Integrated Circuit," Optics Express, Feb. 4, 2019, vol. 27, No. 3, pp. 2499-2508.

Lalanne P., et al., "A Transmission Polarizing Beam Splitter Grating," Journal of Optics A: Pure and Applied Optics, 1999, vol. 1, No. 2, pp. 215-219, 06 Pages.

Lee B.G., et al., "Silicon Photonic Switch Fabrics: Technology and Architecture," Journal of Lightwave Technology, Jan. 1, 2019, vol. 37, No. 1, pp. 6-20.

Lekavich J., "Basics of Acousto-Optic Devices," Acousto-Optic Beam Modulators and Deflectors Control Laserbeams in Many Applications, Lasers & Applications, Apr. 1986, pp. 59-64.

Li C., et al., "Lens-Based Integrated 2D Beam-Steering Device with Defocusing Approach and Broadband Pulse Operation for Lidar Application," Optics Express, Nov. 11, 2019, vol. 27, No. 23, pp. 32970-32983.

Marchetti R., et al., "Coupling Strategies for Silicon Photonics Integrated Chips [Invited]," Photonics Research, Feb. 2019, vol. 7, No. 2, [Published on Jan. 31, 2019], pp. 201-239.

Masood A., et al., "Comparison of Heater Architectures for Thermal Control of Silicon Photonic Circuits," 10th International Conference on Group IV Photonics, 2013, 2 Pages.

Michaels A., EMOpt (2020), Retrieved from URL: https://emopt.readthedocs.io/en/latest/tutorial_2D_grating_coupler.html.

Mu X., et al., "Edge Couplers in Silicon Photonic Integrated Circuits: A Review," Applied Sciences, Feb. 24, 2020, vol. 10, No. 1538, 29 Pages.

Oh C., et al., "Achromatic Diffraction from Polarization Gratings with High Efficiency," Optics Letters, 2008, vol. 33, pp. 2287-2289.

Piggott A.Y., "Understanding the Physics of Coherent LiDAR," 2020, 36 Pages, arXiv:2011.05313 [Jan. 22, 2022].

Rogers C., et al., "A Universal 3D Imaging Sensor on a Silicon Photonics Platform," Nature, Feb. 11, 2021, vol. 590, pp. 256-261, 14 Pages.

Rong H., et al., "An All-Silicon Raman Laser," Nature, Jan. 20, 2005, vol. 433, pp. 292-294.

Tu X., et al., "State of the Art and Perspectives on Silicon Photonic Switches," Micromachines, Jan. 13, 2019, vol. 10, 51, 19 Pages.

Turner-Foster A.C., et al., "Ultrashort Free-Carrier Lifetime in Low-Loss Silicon Nanowaveguides", Optics Express, 2010, vol. 18, No. 4, pp. 3582-3591.

* cited by examiner

200
Light Source 202
Beam Prep 210
$f_0$
212
LO Beam 214
Phase/Frequency Encoding 224
216
RF Modulator 222
218
Digital Signal Processing (DSP) 290
IRP 124
OM 220-2
OM 220-1
$f_2$
$f_1$
230
214-2
ADC 282-2
ADC 282-1
$J_{TX}$
$J_{RX}$
$j_{TX}$
$j_{RX}$
280-1
280-2
Optical Hybrid 270-2
Optical Hybrid 270-1
214-1
Copy of TX Beam 242
240
TX Beam 232
250
RX Beam 264
TX/RX Optical Interface 260
Object(s) 262

ITERATIVE TARGET DETECTION WITH RETRO-REFLECTION REDUCTION IN COHERENT SENSING DEVICES

TECHNICAL FIELD

The instant specification generally relates to range and velocity sensing in applications that involve determining locations and velocities of moving objects using optical signals reflected from the objects. More specifically, the instant specification relates to identification and processing of reflections from multiple objects, including retro-reflections, in detection and ranging sensing devices.

BACKGROUND

Various automotive, aeronautical, marine, atmospheric, industrial, and other applications that involve tracking locations and motion of objects benefit from optical and radar detection technology. A rangefinder (radar or optical) device operates by emitting a series of signals that travel to an object and then detecting signals reflected back from the object. By determining a time delay between a signal emission and an arrival of the reflected signal, the rangefinder can determine a distance to the object. Additionally, the rangefinder can determine the velocity (the speed and the direction) of the object's motion by emitting two or more signals in a quick succession and detecting a changing position of the object with each additional signal. Coherent rangefinders, which utilize the Doppler effect, can determine a longitudinal (radial) component of the object's velocity by detecting a change in the frequency of the arrived wave from the frequency of the emitted signal. When the object is moving away from (or towards) the rangefinder, the frequency of the arrived signal is lower (higher) than the frequency of the emitted signal, and the change in the frequency is proportional to the radial component of the object's velocity. Autonomous (self-driving) vehicles operate by sensing an outside environment with various electromagnetic (radio, optical, infrared) sensors and charting a driving path through the environment based on the sensed data. Additionally, the driving path can be determined based on Global Navigation Satellite System (GNSS) data and road map data. While the GNSS and the road map data can provide information about static aspects of the environment (such as buildings, street layouts, etc.), dynamic information (such as information about other vehicles, pedestrians, cyclists, etc.) is obtained from contemporaneous electromagnetic sensing data. Precision and safety of the driving path and of the speed regime selected by the autonomous vehicle depend on the quality of the sensing data and on the ability of autonomous driving computing systems to process the sensing data and to provide appropriate instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
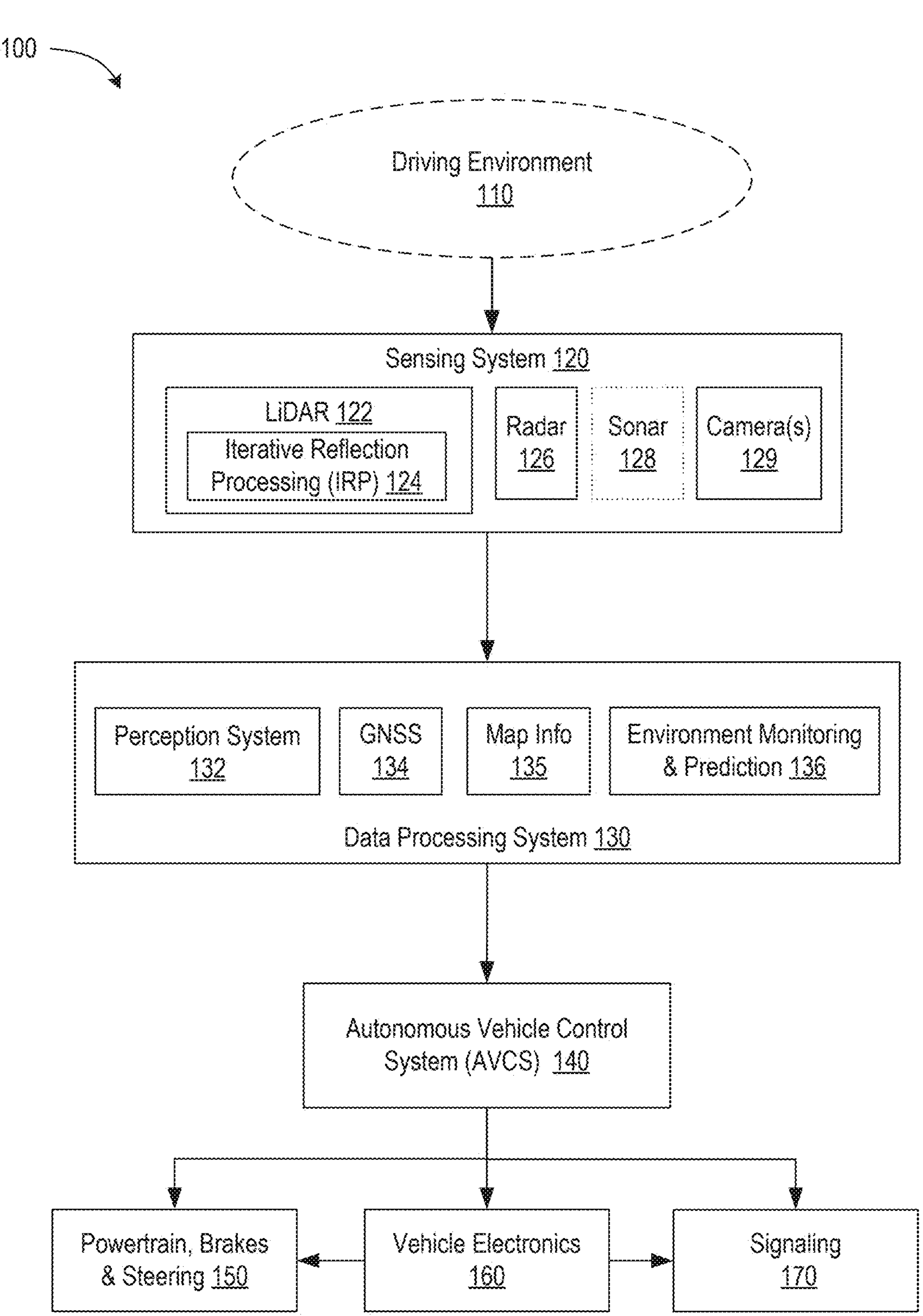
FIG. 1 is a diagram illustrating components of an example autonomous vehicle that can deploy iterative processing of reflections from multiple objects, including identification and reduction of retro-reflections caused by internal components of the lidar devices, for improved efficiency, accuracy, and speed of target characterization, in accordance with some implementations of the present disclosure.

In one implementation, disclosed is a system that includes an optical system configured to generate a modulated transmitted (TX) beam, output the modulated TX beam to an outside environment, and collect a received (RX) beam that includes one or more reflected beams caused by interaction of the modulated TX beam with an object in the outside environment. The system further includes one or more circuits configured to obtain, using the RX beam, a first phase information (PI), wherein the first PI has a first feature and a second feature. The one or more circuits are further to obtain, using a copy of the modulated TX beam, a second PI, and reduce, using the second PI, the first feature of the first PI. The one or more circuits are further to determine, using the second feature of the first PI, one or more characteristics of an object in the outside environment.

In another implementation, disclosed is a lidar apparatus that includes lidar apparatus having a photonic integrated circuit (PIC) that includes a light source configured to generate a light beam, a modulator configured to impart a modulation to the light beam, an optical coupler configured to produce, using the light beam, a TX beam and a copy of the TX beam, and an optical interface configured to output the TX beam to an outside environment and to collect an RX beam. The RX beam includes one or more reflected beams caused by interaction of the TX beam with an object in the outside environment, and a retro-reflected beam caused by an internal, to the lidar apparatus, reflection of the TX beam. The lidar apparatus further includes one or more circuits configured to extract a first PI from the RX beam, wherein the first PI has a first feature representative of the retro-reflected beam and a second feature representative of the one or more reflected beams, extract a second PI from the copy of the TX beam, reduce, using the second PI, the first feature of the first PI, and determine, using the second feature of the first PI, one or more of characteristics of an object in the outside environment.

In another implementation, disclosed is a method to operate a lidar device. The method includes generating a modulated TX beam, outputting the modulated TX beam to an outside environment, and detecting an RX beam that includes one or more reflected beams caused by interaction of the modulated TX beam with an object in the outside environment. The method further includes obtaining, using the RX beam, a first PI, wherein the first PI has a first feature and a second feature, obtaining, using a copy of the modulated TX beam, a second PI, reducing, using the second PI, the first feature of the first PI, and determining, using the second feature of the first PI, one or more characteristics of a first object in the outside environment.

DETAILED DESCRIPTION

An autonomous vehicle (AV) or a driver-operated vehicle that uses various driver-assistance technologies can employ light detection and ranging (lidar) systems to detect distances to various objects in the environment and/or velocities of such objects. A lidar emits one or more laser signals (pulses) that travel to an object and then detects incoming signals reflected from the object. By determining a time delay between the signal emission and the arrival of the reflected waves, a time-of-flight (ToF) lidar can determine the distance to the object. A typical lidar emits signals in multiple directions to obtain a wide view of the driving environment of the AV. The outside environment can be any environment including any urban environment (e.g., a street, and a sidewalk), rural environment, highway environment, indoor environment (e.g., the environment of an industrial plant, a shipping warehouse, and a hazardous area of a building), marine environment, and so on. The outside environment can include multiple stationary objects (e.g., roadways, buildings, bridges, road signs, shoreline, rocks, and trees), multiple movable objects (e.g., vehicles, bicyclists, pedestrians, animals, ships, and boats), and/or any other objects located outside the AV. For example, a lidar device can cover (e.g., scan) an entire 360-degree view by collecting a series of consecutive frames identified with timestamps. As a result, each sector in space is sensed in time increments that are determined by the angular velocity of the lidar's scanning speed. Sometimes, an entire 360-degree view of the outside environment can be obtained over a scan of the lidar. Alternatively, any smaller sector, e.g., a 1-degree sector, a 5-degree sector, a 10-degree sector, or any other sector can be scanned, as desired.

ToF lidars can also be used to determine velocities of objects in the outside environment, e.g., by detecting two (or more) locations $\vec{r}(t_1)$, $\vec{r}(t_2)$ of some reference point of an object (e.g., the front end of a vehicle) and inferring the velocity as the ratio, $\vec{v}=[\vec{r}(t_2)-\vec{r}(t_1)]/[t_2-t_1]$. By design, the measured velocity $\vec{v}$ is not the instantaneous velocity of the object but rather the velocity averaged over the time interval $t_2-t_1$, as the ToF technology does not allow to ascertain whether the object maintained the same velocity $\vec{v}$ during this time or experienced an acceleration or deceleration (with detection of acceleration/deceleration requiring additional locations $\vec{r}(t_3)$, $\vec{r}(t_4)$ . . . of the object).

Coherent or Doppler lidars operate by detecting, in addition to ToF, a change in the frequency of the reflected signal—the Doppler shift—indicative of the velocity of the reflecting surface. Measurements of the Doppler shift can be used to determine, based on a single sensing frame, radial components (along the line of beam propagation) of the velocities of various reflecting points belonging to one or more objects in the outside environment. A signal emitted by a coherent lidar can be modulated (in frequency and/or phase) with a radio frequency (RF) signal prior to being transmitted to a target. A local oscillator (LO) copy of the transmitted signal can be maintained on the lidar and mixed with a signal reflected from the target; a beating pattern between the two signals can be extracted and Fourier-analyzed to determine the Doppler frequency shift of $f_D$ and signal travel time $\tau$ to and from the target. The (radial) velocity V of the target relative to the lidar and the distance L to the target can then be determined as $$V = \frac{cf_D}{2f}, L = \frac{c\tau}{2}.$$

where c is the speed of light and f is the optical frequency of the transmitted signal. More specifically, coherent lidars can determine the velocity of the target and the distance to the target by correlating phase information $\Phi_R$ (t) of the reflected signal with phase modulation $\Phi_{LO}(t-\tau)$ of the time-delayed local oscillator (LO) copy of the transmitted signal. The correlations can be analyzed in the Fourier domain with a peak of the correlation function identifying the time of flight $\tau$.

In some lidar devices, the received beam can be collected through the same optical interface that outputs the transmitted beam (the monostatic transceiver configuration), e.g., using single-mode optical fibers or single-mode waveguides, such as may be deployed in photonic integrated circuits (PICs). The monostatic configuration has significant advantages as the reflected and the transmitted beams are automatically aligned in the same direction in space (implementing a sensing "pixel"). Additionally, the monostatic configuration is more readily scalable than a bistatic configuration, in which the transmitting port (interface) is separate from the receiving port. In particular, the monostatic configuration is capable of imaging a higher number of pixels at once, since fewer hardware elements are needed to support each pixel. The monostatic configuration, however, suffers from retro-reflections occurring when the transmitted beam interacts with various internal components of the lidar, e.g., interfaces of waveguides (optical fibers), optical gratings, couplers, circulators, beam splitters, combiners, and the like. Surface imperfections of waveguides and fibers can also contribute to retro-reflections. Because target objects can be located at substantial distances from the lidar device, retro-reflections can be orders of magnitude stronger than reflections from the target objects. Retro-reflections can be especially detrimental to lidar devices that use phase modulation techniques.

In some instances, a beam received by the lidar device can be reflected from multiple objects, which can be located at different distances from the lidar transceiver. For example, a portion of a wave front of a lidar beam can reflect from an edge of a first object, e.g., a road sign or a first vehicle, while another portion of the same wave front can reflect from a second object, e.g., a second vehicle, located at some distance behind the first object. The first object can have a high reflectance, e.g., a retroreflective surface of the road sign or a glossy surface of the first vehicle, while the second object can be positioned significantly farther behind the first object, so that the reflection from the second object is represented in the beam received by the lidar device with a significantly weaker amplitude. As a result, a typical reflected beam can include multiple contributions with a hierarchy of strengths (amplitudes), e.g., with the internal retro-reflections being the strongest, reflection (optical signal) from a closely positioned object being much weaker, reflection(s) from more distant objects being even weaker, and so on. A combination of optical signals of significantly different strengths makes distinguishing weaker signals difficult, or in some situations, impossible. For example, weaker signals whose strength is 60-100 dB (for frequency-modulated lidars) or 20-40 dB (for phase-modulated lidars) less than the strength of the dominant signal usually cannot be distinguished by existing lidar devices.

Aspects and implementations of the present disclosure address these and other challenges of the existing sensing technology by providing for methods and systems that enable iterative processing of reflections from multiple objects, including identification and elimination of retro-reflections caused by internal components of the lidar devices. More specifically, a copy of a modulated transmitted beam can be maintained on the lidar device and used as a reference signal against which a beam reflected from an outside environment is compared. The reflected beam can include strong retro-reflection artifacts generated upon interaction of the transmitted beam with various lidar components (e.g., optical circulators, beam splitters, optical interfaces, and the like) and one or more reflections, of unequal strengths, from target objects. Each of the reflected beam and the copy of the transmitted beam can be processed using respective coherent detectors that extract modulation information from the respective beam. The modulation information (e.g., in the form of an electrical signal) extracted from each beam can be cross-correlated with a signal that was used to impart modulation (e.g., phase modulation) to the transmitted beam. The cross-correlation determined for the copy of the transmitted (TX) beam can have a peak centered at a small delay time that is associated with the passage of the transmitted beam through an optical modulator (that imparts the modulation) and/or other optical elements. The cross-correlation determined for the reflected beam can have multiple peaks, e.g., a peak associated with an internal (to the lidar) retro-reflection, another peak associated with a reflection from a close object, yet another peak associated with a reflection a more distant object, and so on. In some instances, each subsequent peak can be associated with an increased delay time (compared with the previous peak) and decreased strength (although in some instances a more distant glossy object can generate a stronger return than a closer diffusively reflecting object). A digital signal processor (DSP) can identify the strongest peak in the cross-correlation for the RX beam and determine the corresponding delay time (representative of the time of flight to the reflecting object), the magnitude and phase shift relative to a reference peak, e.g., the peak in the cross-correlation determined for the copy of the TX beam. The DSP can first eliminate the strongest peak (e.g., the internal retro-reflection peak) by selecting a suitable combination of the two cross-correlations. The residual cross-correlation of the RX beam can be processed similarly, by identifying and similarly eliminating the next strongest reflection, and so on, until all discernible peaks corresponding to reflections from various objects are processed.

The advantages of the disclosed implementations include, but are not limited to, elimination of spurious internal retro-reflections and efficient and accurate processing of reflections from multiple objects of significantly different strengths. Accurate determination of velocities and distances to outside objects improves safety of lidar-based applications, including but not limited to autonomous vehicle driving missions.

FIG. 1 is a diagram illustrating components of an example autonomous vehicle (AV) 100 that can deploy iterative processing of reflections from multiple objects, including identification and reduction of retro-reflections caused by internal components of the lidar devices, for improved efficiency, accuracy, and speed of target characterization, in accordance with some implementations of the present disclosure. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, and sidewalk delivery robotic vehicles) capable of being operated in a self-driving mode (without a human input or with a reduced human input).

Vehicles, such as those described herein, can be configured to operate in one or more different driving modes. For instance, in a manual driving mode, a driver can directly control acceleration, deceleration, and steering via inputs such as an accelerator pedal, a brake pedal, a steering wheel, etc. A vehicle can also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles can be known by different names including, for example, autonomously driven vehicles, self-driving vehicles, and so on.

As described herein, in a semi or partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle can perform all driving tasks in certain situations, the human driver is expected to be responsible for taking control as needed.

Although, for brevity and conciseness, various systems and methods are described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

A driving environment 110 can be or include any portion of the outside environment containing objects that can determine or affect how driving of the AV occurs. More specifically, a driving environment 110 can include any objects (moving or stationary) located outside the AV, such as roadways, buildings, trees, bushes, sidewalks, bridges, mountains, other vehicles, pedestrians, bicyclists, and so on. The driving environment 110 can be urban, suburban, rural, and so on. In some implementations, the driving environment 110 can be an off-road environment (e.g. farming or agricultural land). In some implementations, the driving environment can be inside a structure, such as the environment of an industrial plant, a shipping warehouse, a hazardous area of a building, and so on. In some implementations, the driving environment 110 can consist mostly of objects moving parallel to a surface (e.g., parallel to the surface of Earth). In other implementations, the driving environment can include objects that are capable of moving partially or fully perpendicular to the surface (e.g., balloons, and leaves falling). The term "driving environment" should be understood to include all environments in which motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the UV range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. Radar unit 126 can deploy a sensing technology that is similar to the lidar technology but uses a radio wave spectrum of the electromagnetic waves. For example, radar unit 126 can use 10-100 GHz carrier radio frequencies. Radar unit 126 can be a pulsed ToF radar, which detects a distance to the objects from the time of signal propagation, or a continuously-operated coherent radar, which detects both the distance to the objects as well as the velocities of the objects, by determining a phase difference between transmitted and reflected radio signals. Compared with lidars, radar sensing units have lower spatial resolution (by virtue of a much longer wavelength), but lack expensive optical elements, are easier to maintain, have a longer working range, and are less sensitive to adverse weather conditions. An AV can often be outfitted with multiple radar transmitters and receivers as part of the radar unit 126. The radar unit 126 can be configured to sense both the spatial locations of the objects (including their spatial dimensions) and their velocities (e.g., using the radar Doppler shift technology). The sensing system 120 can include a lidar sensor 122 (e.g., a lidar rangefinder), which can be a laser-based unit capable of determining distances to the objects in the driving environment 110 as well as, in some implementations, velocities of such objects. The lidar sensor 122 can utilize wavelengths of electromagnetic waves that are shorter than the wavelength of the radio waves and can thus provide a higher spatial resolution and sensitivity compared with the radar unit 126. The lidar sensor 122 can include a ToF lidar and/or a coherent lidar sensor, such as a frequency-modulated continuous-wave (FMCW) lidar sensor, phase-modulated lidar sensor, amplitude-modulated lidar sensor, and the like. Coherent lidar sensor can use optical heterodyne detection for velocity determination. In some implementations, the functionality of the ToF lidar sensor and coherent lidar sensor can be combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor units can be mounted on an AV, e.g., at different locations separated in space, to provide additional information about a transverse component of the velocity of the reflecting object.

Lidar sensor 122 can include one or more laser sources producing and emitting signals and one or more detectors of the signals reflected back from the objects. Lidar sensor 122 can include spectral filters to filter out spurious electromagnetic waves having wavelengths (frequencies) that are different from the wavelengths (frequencies) of the emitted signals. In some implementations, lidar sensor 122 can include directional filters (e.g., apertures, diffraction gratings, and so on) to filter out electromagnetic waves that can arrive at the detectors along directions different from the reflection directions for the emitted signals. Lidar sensor 122 can use various other optical components (lenses, mirrors, gratings, optical films, interferometers, spectrometers, local oscillators, and the like) to enhance sensing capabilities of the sensors.

In some implementations, lidar sensor 122 can include one or more 360-degree scanning units (which scan the outside environment in a horizontal direction, in one example). In some implementations, lidar sensor 122 can be capable of spatial scanning along both the horizontal and vertical directions. In some implementations, the field of view can be up to 90 degrees in the vertical direction (e.g., with at least a part of the region above the horizon scanned by the lidar signals or with at least part of the region below the horizon scanned by the lidar signals). In some implementations (e.g., in aeronautical environments), the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operate, generally, at the near-infrared wavelength, but can include sensing technology that operate at other wavelengths as well.

Lidar sensor 122 can include an iterative reflection processing module (IRP) 124, which can use a combination of hardware elements and software components capable of performing iterative processing of reflections from multiple objects, including identification and elimination (or reduction) of retro-reflections caused by internal components of lidar sensor 122. IRP 124 can deploy a variety of elements to deploy techniques as described below in conjunction with FIGS. 2-7. For example, IRP 124 can include optical elements that generate one or more reference copies of the modulated TX beam. The optical elements can include beam splitters, optical couplers, circulators, optical amplifiers, optical modulators, and the like. TRP 124 can further include electronic circuitry, such as coherent photodetectors to extract phase information from the RX beam and the copy of the modulated TX beam. In some implementations, the RX beam and/or the copy of the modulated TX beam can be inputted into coherent photodetectors together with local oscillator copies of the unmodulated TX beam.

The electronic circuitry of IRP 124 can perform radio frequency processing, e.g., processing of phase and/or frequency modulation of the TX beam and/or RX beam. The electronic circuitry of RP 124 can further perform digital signal processing, which can include computation of cross-correlations of electronic signals representative of the modulation of the RX beam and/or the TX beam. Digital signal processing can perform one or more iterations to eliminate internal retro-reflections and to determine range and/or velocity of various objects present in the driving environment of the vehicle. Additional elements of IRP 124 and various combinations of such elements are further illustrated in conjunction with FIGS. 2-6 below.

The sensing system 120 can further include one or more cameras 129 to capture images of the driving environment 110. The images can be two-dimensional projections of the driving environment 110 (or parts of the driving environment 110) onto a projecting plane of the cameras (flat or non-flat, e.g. fisheye cameras). Some of the cameras 129 of the sensing system 120 can be video cameras configured to capture a continuous (or quasi-continuous) stream of images of the driving environment 110. Some of the cameras 129 of the sensing system 120 can be high resolution cameras (HRCs) and some of the cameras 129 can be surround view cameras (SVCs). The sensing system 120 can also include one or more sonars 128, which can be ultrasonic sonars, in some implementations.

The sensing data obtained by the sensing system 120 can be processed by a data processing system 130 of AV 100. In some implementations, the data processing system 130 can include a perception system 132. Perception system 132 can be configured to detect and track objects in the driving environment 110 and to recognize/identify the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (Doppler data and/or ToF data) to determine distances to various objects in the driving environment 110 and velocities (radial and transverse) of such objects. In some implementations, the perception system 132 can also receive the radar sensing data, which can similarly include distances to various objects as well as velocities of those objects. Radar data can be complementary to lidar data, e.g., whereas lidar data can include high-resolution data for low and mid-range distances (e.g., up to several hundred meters), radar data can include lower-resolution data collected from longer distances (e.g., up to several kilometers or more). In some implementations, perception system 132 can use the lidar data and/or radar data in combination with the data captured by the camera(s) 129. In one example, the camera(s) 129 can detect an image of road debris partially obstructing a traffic lane. Using the data from the camera(s) 129, perception system 132 can be capable of determining the angular extent of the debris. Using the lidar data, the perception system 132 can determine the distance from the debris to the AV and, therefore, by combining the distance information with the angular size of the debris, the perception system 132 can determine the linear dimensions of the debris as well.

In another implementation, using the lidar data, the perception system 132 can determine how far a detected object is from the AV and can further determine the component of the object's velocity along the direction of the AV's motion. Furthermore, using a series of quick images obtained by the camera, the perception system 132 can also determine the lateral velocity of the detected object in a direction perpendicular to the direction of the AV's motion. In some implementations, the lateral velocity can be determined from the lidar data alone, for example, by recognizing an edge of the object (using horizontal scanning) and further determining how quickly the edge of the object is moving in the lateral direction. The perception system 132 can receive one or more sensor data frames from the sensing system 120. Each of the sensor frames can include multiple points. Each point can correspond to a reflecting surface from which a signal emitted by the sensing system 120 (e.g., lidar sensor 122) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on.

The perception system 132 can further receive information from a positioning subsystem, which can include a GPS transceiver (not shown), configured to obtain information about the position of the AV relative to Earth and its surroundings. The GNSS (or other positioning) data processing module 134 can use the positioning data (e.g., GNSS, GPS, and IM data) in conjunction with the sensing data to help accurately determine the location of the AV with respect to fixed objects of the driving environment 110 (e.g. roadways, lane boundaries, intersections, sidewalks, crosswalks, road signs, curbs, and surrounding buildings) whose locations can be provided by map information 135. In some implementations, the data processing system 130 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

Data processing system 130 can further include an environment monitoring and prediction component 136, which can monitor how the driving environment 110 evolves with time, e.g., by keeping track of the locations and velocities of the moving objects. In some implementations, environment monitoring and prediction component 136 can keep track of the changing appearance of the driving environment due to motion of the AV relative to the environment. In some implementations, driving environment monitoring and prediction component 136 can make predictions about how various moving objects of the driving environment 110 will be positioned within a prediction time horizon. The predictions can be based on the current locations and velocities of the moving objects as well as on the tracked dynamics of the moving objects during a certain (e.g., predetermined) period of time. For example, based on stored data for object 1 indicating accelerated motion of object 1 during the previous 3-second period of time, environment monitoring and prediction component 136 can conclude that object 1 is resuming its motion from a stop sign or a red traffic light signal. Accordingly, environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, environment monitoring and prediction component 136 can conclude that object 2 is stopping at a stop sign or at a red traffic light signal. Accordingly, environment monitoring and prediction component 136 can predict where object 2 is likely to be within the next 1 or 3 seconds. Environment monitoring and prediction component 136 can perform periodic checks of the accuracy of its predictions and modify the predictions based on new data obtained from the sensing system 120.

The data generated by the perception system 132, the GNSS data processing module 134, and environment monitoring and prediction component 136 can be used by an autonomous driving system, such as AV control system (AVCS) 140. The AVCS 140 can include one or more algorithms that control how AV 100 is to behave in various driving situations and driving environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size, shape, and trajectories of the obstacles (if obstacles are moving) and select an optimal driving strategy (e.g., braking, steering, and accelerating) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, etc.), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions outputted by the AVCS 140 can be delivered directly to the powertrain, brakes, and steering 150 (or signaling 170) whereas other instructions outputted by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain, brakes, and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain, brakes, and steering 150 to resume the previous speed settings of the vehicle.

Figure 2:
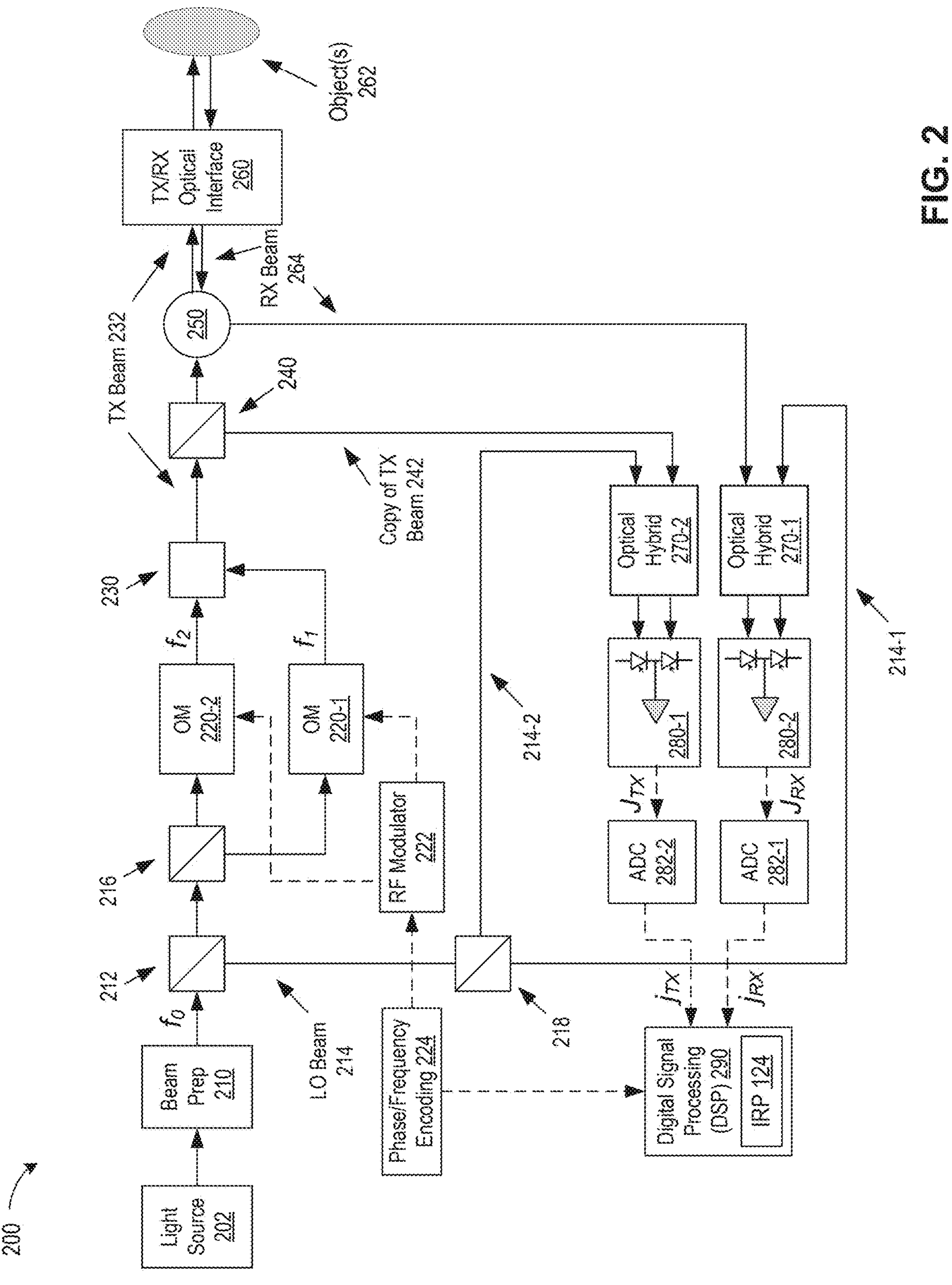
FIG. 2 is a block diagram illustrating an example optical sensing system capable of iterative processing of reflections from multiple objects, including identification and reduction of internal retro-reflections, in accordance with some implementations of the present disclosure.

FIG. 2 is a block diagram illustrating an example optical sensing system 200 capable of iterative processing of reflections from multiple objects, including identification and reduction of internal retro-reflections, in accordance with some implementations of the present disclosure. Sensing system 200 can be a part of lidar sensor 122 that includes TRP 124. As depicted in FIG. 2, a light source 202 can produce one or more beams of light. "Beams" should be understood herein as referring to any signals of electromagnetic radiation, such as beams, wave packets, pulses, sequences of pulses, or other types of signals. Solid arrows in FIG. 2 (and other figures) indicate optical signal propagation whereas dashed arrows depict propagation of electrical (e.g., RF or other analog) signals or electronic (e.g., digital) signals. Light source 202 can be a broadband laser, a narrow-band laser, a light-emitting diode, and the like. Light source 202 can be a semiconductor laser, a gas laser, an ND:YAG laser, or any other type of a laser. Light source 202 can be a continuous wave laser, a single-pulse laser, a repetitively pulsed laser, a mode locked laser, and the like.

In some implementations, light outputted by light source 202 can be conditioned (pre-processed) by one or more components or elements of a beam preparation stage 210 of the optical sensing system 200 to ensure a narrow-band spectrum, target linewidth, coherence, polarization (e.g., circular or linear), and other optical properties that enable coherent (e.g., Doppler) measurements described below. Beam preparation can be performed using filters (e.g., narrow-band filters), resonators (e.g., resonator cavities, crystal resonators), polarizers, feedback loops, lenses, mirrors, diffraction optical elements, and other optical devices. For example, if light source 202 is a broadband light source, the output light can be filtered to produce a narrowband beam. In some implementations, in which light source 202 produces light that has a desired linewidth and coherence, the light can still be additionally filtered, focused, collimated, diffracted, amplified, polarized, etc., to produce one or more beams of a desired spatial profile, spectrum, duration, frequency, polarization, repetition rate, and so on. In some implementations, light source 202 can produce (alone or in combination with beam preparation stage 210) a narrow-linewidth light with a linewidth below 100 KHz.

After the light beam is configured by beam preparation stage 210, the light beam can undergo spatial separation at a beam splitter 212, which produces a local oscillator (LO) beam 214. The LO beam 214 can be a copy (up to an amplitude, which can be different) of the beam outputted by beam preparation stage 210 and can be used as a reference signal against which a signal reflected from a target object (or multiple target objects) is compared. The beam splitter 212 can be a prism-based beam splitter, a partially-reflecting mirror, a polarizing beam splitter, a beam sampler, a fiber optical coupler (optical fiber adaptor), or any similar beam splitting element (or a combination of two or more beam-splitting elements). The beam splitter 212 can be a 95:5, 90:10, 80:20 beam splitter (or a beam splitter with some other suitable ratio) with the LO beam 214 carrying a smaller portion of the total energy of the light beam. The remaining light beam can be delivered to a beam splitter 216 that splits the light beam into two light beams. The first light beam can be directed through an optical modulator 220-1 and the second light beam can be directed through an optical modulator 220-2. Delivery of various light beams between light source 202, beam splitters 212, 216, optical modulators **220-*n* (as well as between any other optical components depicted in FIG. 2** or other figures) can occur over air or via any suitable light carriers, such as optical fibers and/or waveguides.

In some implementations, optical modulator 220-1 can impart, to the first light beam, a frequency offset $f_1-f_0$ from a frequency $f_0$ of the light beam produced by light source 202 (and/or beam preparation stage 210). Optical modulator 220-1 can also impart optical modulation to the first light beam. "Optical modulation" is to be understood herein as referring to any form of angle modulation, such as phase modulation (e.g., any sequence of phase changes $\Delta\phi(t)$ as a function of time t that are added to the phase of the beam), frequency modulation (e.g., any sequence of frequency changes $\Delta f(t)$ as a function of time t), or any other type of modulation (including a combination of a phase and a frequency modulation) that affects the phase of the wave. Optical modulation is also to be understood to include, where applicable, amplitude modulation $\Delta A(t)$ as a function of time t Amplitude modulation can be applied to light in combination with angle modulation or separately, without angle modulation.

In some implementations, optical modulator 220-2 can impart, to the second light beam, a different frequency offset $f_2-f_0$. In some implementations, optical modulator 220-2 does not apply modulation to the second light beam. The first light beam with frequency $f_1$ and the imparted modulation can be used for determination of the distances to those objects. The second unmodulated beam (the pilot tone) with frequency $f_2$ can be used for determination of velocities of various objects via identification of Doppler shifts $f_D$ imparted to the reflected light by those objects. The frequency offset $f_2-f_0$ can facilitate identification of Doppler shifts of opposite signs (and hence allow detection of the direction of motion of the objects), since frequencies $f_2+f_D$ and $f_2-f_D$ are spaced differently from frequency $f_0$ of LO beam 214 against which the RX beam is to be compared. In some implementations, the second light beam can have a zero offset ($f_1=f_0$) relative to LO beam 214. In such implementations, optical modulator 220-2 can be absent.

In some implementations, optical modulator 220-1 can impart an angle modulation to the first light beam using one or more RF circuits, such as RF modulator 222, which can include one or more RF local oscillators, mixers, amplifiers, filters, and the like. Even though, for brevity and conciseness, modulation is referred to herein as being performed using RF signals, it should be understood that other frequencies can also be used for angle modulation, including but not limited to Terahertz frequencies, microwave frequencies, and so on. RF modulator 222 can impart optical modulation in accordance with a programmed modulation scheme, e.g., encoded in a sequence of control signals provided by a phase/frequency encoding module (herein also referred to, for simplicity, as encoding module) 224. The control signals can be in an analog format or a digital format. In the latter instances, RF modulator 222 can further include a digital-to-analog converter (DAC) that transforms digital control signals to the analog form. The encoding module 224 can implement any suitable encoding (keying), e.g., linear frequency chirps (e.g., a chirp-up/chirp-down sequence), pseudorandom keying sequence of phase $\Delta\phi$ or frequency $\Delta f$ shifts, and the like. The encoding module 224 can provide the encoding data to RF modulator 222 that can convert the provided data to RF electrical signals and apply the RF electrical signals to optical modulator 220-1 that modulates the first light beam.

In some implementations, optical modulator 220-1 (and, similarly, optical modulator 220-2) can include an acousto-optic modulator (AOM), an electro-optic modulator (EOM), a Lithium Niobate modulator, a heat-driven modulator, a Mach-Zehnder modulator, and the like, or any combination thereof. In some implementations, optical modulator 220-1 can include a quadrature amplitude modulator (QAM) or an in-phase/quadrature modulator (IQM). Optical modulator 220-1 can include multiple AOMs, EOMs, IQMs, one or more beam splitters, phase shifters, combiners, and the like. For example, optical modulator 220-1 can split an incoming light beam into two beams, modify a phase of one of the split beams (e.g., by a 90-degree phase shift), and pass each of the two split beams through a separate optical modulator to apply angle modulation to each of the two beams using a target encoding scheme. The two beams can then be combined into a single beam. In some implementations, angle modulation can add phase/frequency shifts that are continuous functions of time. In some implementations, added phase/frequency shifts can be discrete and can take on a number of values, e.g., N discrete values across the phase interval $2\pi$ (or across a frequency band of a predefined width). Optical modulator 220-1 can add a predetermined time sequence of the phase/frequency shifts to the light beam. In some implementations, a modulated RF signal can cause optical modulator 220-1 to impart to the first light beam a sequence of frequency up-chirps interspersed with down-chirps. In some implementations, phase/frequency modulation can have a duration between a microsecond and tens of microseconds and can be repeated with a repetition rate ranging from one or several kilohertz to hundreds of kilohertz. Any suitable amplifier (not shown in FIG. 2 for conciseness) can amplify the modulated first light beam.

A beam combiner 230 can combine the first (modulated) light beam with frequency $f_1$ and the second (unmodulated) light beam with frequency $f_2$ to generate a TX beam 232. TX beam 232 can further undergo amplification using a suitable optical amplifier (not shown in FIG. 2), which can be an Erbium-doped amplifier, a waveguide-integrated amplifier, a saturation amplifier, and the like, or any combination thereof. A beam splitter 240 can split off a small portion (e.g., 1 percent, 2 percent, 5 percent, etc.) from TX beam 232 to create a copy of TX beam 242 to be used internally for iterative processing of information carried by reflected beam (s). TX beam 232 can be transmitted through an optical circulator 250 and an optical interface 260 towards one or more objects 262 in the outside environment. Optical interface 260 can include one or more optical elements, e.g., apertures, lenses, mirrors, collimators, polarizers, waveguides, optical switches, optical phased arrays, and the like, or any such combination of optical elements. Optical interface 260 can include a transmitting (TX) interface to output TX beam 232 and a separate receiving (RX) interface to collect RX beam 264 reflected from object(s) 260. In some implementations, some of the optical elements (e.g., lenses, mirrors, collimators, optical fibers, waveguides, optical switches, optical phased arrays, beam splitters, and the like) can be shared by the TX interface and the RX interface. As shown in FIG. 2, in a combined TX/RX optical interface 260, the TX beam 232 and the RX beam 264 can follow (at least partially) the same optical paths. TX beam 232 and RX beam 264 can be separated by optical circulator 250, which can be a Faraday effect-based device, a birefringent crystal-based device, or any other suitable device. RX beam 264 can be a combination of a light reflected from object 262 (or multiple such objects) and a light retro-reflected from various optical components of the optical interface 260 (e.g., lenses, gratings, couplers, junctions, waveguide openings, and the like). A stray TX light entering the downward port of the optical circulator 250 can also contribute to the retro-reflected light.

Although not shown explicitly in FIG. 2 (and similarly, in FIGS. 4-6), one or more optical amplifiers can be placed between various elements and components of the example sensing systems. For example, an optical amplifier can be placed between light source 202 and beam preparation stage 212, between beam preparation stage 210 and beam splitter 212, between beam splitter 212 and beam splitter 216, between beam combiner 230 and beam splitter 240, and/or other suitable locations.

RX beam 264 can be inputted into a first optical hybrid stage 270-1 whose second input can be a first copy of LO beam 214-1. The copy of TX beam 242 can be inputted into a second optical hybrid stage 270-2 whose second input can be a second copy of LO beam 214-2. The first copy of LO beam 214-1 and the second copy of LO beam 214-2 can be obtained by splitting LO beam 214 using a beam splitter 218. Beam splitter 218 can be a 50:50 beam splitter or a splitter with some other split ratio.

Optical hybrid stages 270-1 and/or 270-2 can perform pre-conditioning of the input beams prior to processing by respective coherent detection stages 280-1 and/or 280-2. In some implementations, optical hybrid stages 270-1 and/or 270-2 can be 180-degree hybrid stage(s) capable of detecting the absolute value of a phase difference of the input beams. In some implementations, optical hybrid stages 270-1 and/or 270-2 can be 90-degree optical hybrid stage(s) capable of detecting both the absolute value and a sign of the phase difference of the input beams. For example, in the latter case, each optical hybrid stage **270-*n* can be designed to split each of the respective input beams into multiple copies (e.g., four copies). Optical hybrid stage 270-*n* can apply controlled phase shifts (e.g., 90°, 180°, 270°) to some of the copies, e.g., copies of the LO beam 214-*n*, and then mix the phase-shifted copies of the LO beam with other input beams, e.g., the copy of TX beam 242 and/or RX beam 264. For example, optical hybrid stage 270-1 can produce the in-phase symmetric and anti-symmetric combinations $(E_{RX}+E_{LO})/2$ and $(E_{RX}-E_{LO})/2$ of the RX beam 264 (whose electric field is denoted with $E_{RX}$) and the first copy of LO beam 214-1** (whose electric field is denoted with $E_{LO}$), and also produce the quadrature 90-degree-shifted combinations $(E_{RX}+iE_{LO})/2$ and $(E_{RX}-iE_{LO})/2$ of the same beams (herein i is the imaginary unit number).

The coherent detection stage 280-1 (and, similarly, 280-2) receives four input combinations $E_{RX}\pm E_{LO}$ and $E_{RX}\pm iE_{LO}$ (in case of a 90-degree optical hybrid stage 270-1) or two combinations $E_{RX}\pm E_{LO}$ (in case of a 180-degree optical hybrid stage 270-1). The coherent detection stage 280-1 then processes the received inputs using one or more coherent light analyzers, such as balanced photodetectors, to detect a phase information carried by RX beam 264 and the first copy of LO beam 214-1. A balanced photodetector can have photodiodes connected in series and can generate AC electrical signals that are proportional to a difference of intensities of the input optical modes (which can also be pre-amplified). A balanced photodetector can include photodiodes that are Si-based, InGaAs-based, Ge-based, Si-on-Ge-based, and the like (e.g. avalanche photodiode). In some implementations, balanced photodetectors can be manufactured on a single chip, e.g., using complementary metal-oxide-semiconductor (CMOS) structures, silicon photomultiplier (SiPM) devices, or similar systems. In the implementation depicted in FIG. 2, LO beam 214 (and thus the copies of the LO beam **214-*n*) are unmodulated, but it should be understood that in other implementations consistent with the present disclosure, LO beam 214 can also be modulated. For example, optical modulator 220-1 can be positioned between beam preparation stage 210 and beam splitter 212 causing both LO beam 214 and TX beam 232** to be modulated.

Each of the input signals can be received by respective photodiodes connected in series. An in-phase electric current I can be produced by a first pair of the photodiodes and a quadrature current Q can be produced by a second pair of photodiodes. Each of the currents can be further processed by one or more operational amplifiers, intermediate frequency amplifiers, and the like. The in-phase I and quadrature Q currents can then be mixed into a complex photocurrent whose AC part $$J_{RX} = \left|\frac{E_{RX}+E_{LO}}{2}\right|^2 - \left|\frac{E_{RX}-E_{LO}}{2}\right|^2 + i\left|\frac{E_{RX}+iE_{LO}}{2}\right|^2 - i\left|\frac{E_{RX}+iE_{LO}}{2}\right|^2 = E_{RX}E_{LO}^*$$

is sensitive to both the absolute value and the sign of the phase difference of $E_{RX}$ and $E_{LO}$. Similarly, an 180-degree optical hybrid can produce only the in-phase photocurrent whose AC part $$J_{RX} = \left|\frac{E_{RX}+E_{LO}}{2}\right|^2 - \left|\frac{E_{RX}-E_{LO}}{2}\right|^2 = \mathrm{Re}[E_{RX}E_{LO}^*]$$

is sensitive to the absolute value of the phase difference but not to the sign of this phase difference. Photocurrent $J_{RX}(t)$ is representative of the information carried by RX beam 264. Similar operations can be performed on the copy of TX beam 242 using optical hybrid stage 270-2 and coherent detection stage 280-2 to obtain photocurrent $J_{TX}(t)$ representative of the information carried by the copy of TX beam 242.

The photocurrent $J_{RX}(t)$ can be digitized using analog-to-digital circuitry (ADC) 282-1 and the photocurrent $J_{TX}(t)$ can be digitized using ADC 282-2, which produce respective digitized electrical signals, referred to herein using the lowercase notations, $j_{RX}(t)$ and $j_{TX}(t)$. The digitized signals $j_{RX}(t)$ and $j_{TX}(t)$ can be provided to digital signal processing (DSP) 290, for iterative target identification and elimination (or reduction) of retro-reflections.

Figure 3:
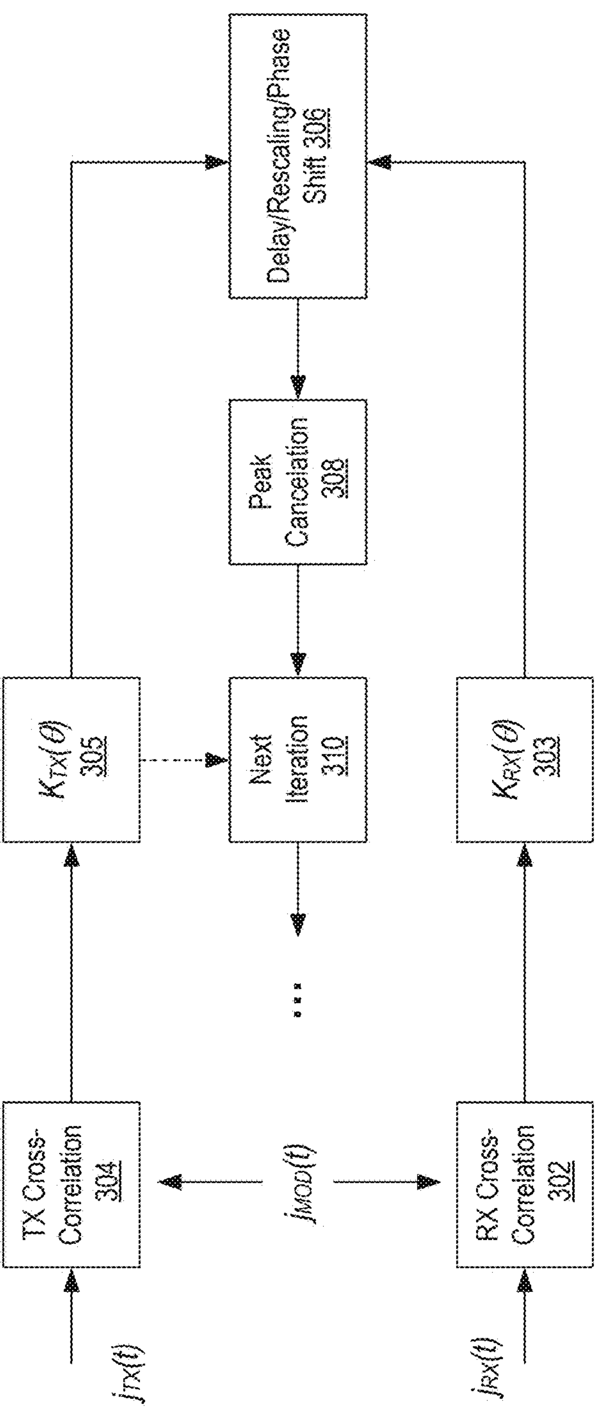
FIG. 3 is a block diagram illustrating example iterative reflection processing of reflections from one or more objects that can include elimination or reduction of internal retro-reflections, in accordance with some implementations of the present disclosure.

FIG. 3 is a block diagram illustrating example iterative reflection processing 124 of reflections from one or more objects that can include elimination or reduction of internal retro-reflections, in accordance with some implementations of the present disclosure. In some implementations, IRP 124 can be performed by DSP 290 of FIG. 2. Example IRP 124 can include one or more modules that compute cross-correlations between digital signals $j_{RX}(t)$ and $j_{TX}(t)$ and a reference signal $j_{MOD}(t)$ that characterizes angular modulation imparted to TX beam 232 by optical modulator 220-1 and stored as part of phase/frequency encoding 224. Below, example IRP 124 is described using phase modulation as an example, but it should be understood that similar processing can be performed for other types of modulation, e.g., frequency modulation and/or amplitude modulation.

More specifically, phase encoding can include a suitable sequence of phase shifts $\Delta\phi(t_k)$ imparted by optical modulator 220-1, where $t_j$ indicates time when the respective (e.g., kth) phase shift $\Delta\phi(t_k)$ is applied. In some implementations, phase shifts $\Delta\phi(t_j)$ include a discrete set of phase shifts applied for a fixed duration $\Delta t=t_{k+1}-t_k$. The sequence of phase shifts can have a certain period T, such that the sequence is repeated after each period T, $\Delta\phi(t_k+T)=\Delta\phi(t_k)$, with $M=T/\Delta t$ phase shifts applied during a single period. In some implementations, the phase shifts applied can be based on maximum-length sentences, Gold codes, Hadamar codes, Kasami codes, Barker codes, or any similar codes. In some implementations, the phase shifts can be selected in such a way as to make the correlation function of the reference signal $j_{MOD}(t)$, $$K_{MOD}(\theta) = \frac{1}{M}\sum_{k=1}^{M} j_{MOD}(t_k)\cdot j_{MOD}(t_k-\theta),\ j_{MOD}(t_k) = e^{i\Delta\phi(t_k)}$$

a sharply peaked function of the time offset $\theta$, having a maximum (peak) at $\theta=0$, referred herein to $S(\theta)$, and a significantly smaller and more uniform background contribution. Note: in the expression for the correlation function $K(\theta)$, the amplitude of the reference signal $j_{MOD}(t)$ is set to unity for brevity and conciseness, but can be set to any other value. RX cross-correlation module 302 can compute RX cross-correlation 303 of the digital signal $j_{RX}(t)$ with the reference signal $j_{MOD}(t)$, e.g., $$K_{RX}(\theta) = \frac{1}{M}\sum_{k=1}^{M} j_{RX}(t_k)\cdot j_{MOD}(t_k-\theta).$$

The RX cross-correlation $K_{RX}(\theta)$ 303 can have sharp peaks (maxima) associated with reflections from various objects, e.g., a peak at $\theta=\tau_0$ corresponding to an internal retro-reflection with a delay time $\tau_0$ associated with internal components of the lidar (optical modulator(s), amplifier(s), beam splitters/combiners, and so on). The RX cross-correlation $K_{RX}(\theta)$ 303 can have a peak at $\theta=\tau_1\equiv 2L_1/c$ corresponding to a reflection with a delay time $\tau_1$ from a first object (e.g., a road sign, a vehicle, etc.) located at a distance $L_1$ from the lidar. RX cross-correlation $K_{RX}(\theta)$ 303 can have another peak at $\theta=\tau_2\equiv 2L_1/c$ corresponding to a reflection with a delay time $T_2$ from a second object (e.g., a road sign, a vehicle, etc.) located at a distance $L_2$ from the lidar; and so on. Correspondingly, RX cross-correlation $K_{RX}(\theta)$ 303 includes a sequence of peaks (with complex amplitudes $A_0$, $A_1$, $A_2$ . . . ) and a noise contribution $N_{RX}(\theta)$, $$K_{RX}(\theta) = A_0\cdot S(\theta-\tau_0) + A_1\cdot S(\theta-\tau_1) + A_2\cdot S(\theta-\tau_2) + \ldots + N_{RX}(\theta).$$

The amplitudes $A_0$, $A_1$, $A_2$ . . . can be progressively decreasing with the distance to the respective objects, e.g., with the amplitude of internal retro-reflection being much larger than the amplitude of reflection from the closest external object, $|A_0|>>|A_1|$, the amplitude of the reflection from the closest object to the next object, $|A_1|>>|A_2|$, and so on. Identification of the amplitude $A_1$ of each subsequent peak and the respective delay time Tt by digital signal processing 290 can be hampered by the presence of higher amplitude peaks . . . $A_{l-2}$, $A_{l-1}$.

The form of the peak $S(\theta)$ can be estimated using TX cross-correlation module 304 that computes TX cross-correlation $K_{TX}(\theta)$ 305 of the digital signal $j_{TX}(t)$ with the reference signal $j_{MOD}(t)$, e.g., $$K_{TX}(\theta) = \frac{1}{M}\sum_{k=1}^{M} j_{TX}(t_k)\cdot j_{MOD}(t_k-\theta).$$

The TX cross-correlation $K_{TX}(\theta)$ 305 can have a single peak at $\theta=\tilde{t}$ corresponding to a delay time $\tilde{t}$ and associated with the propagation of c through optical modulator 220-1, beam combiner 230, beam splitter 240, and/or other internal components of the lidar, e.g., $K_{TX}(\theta)=\tilde{A}\cdot S(\theta-\tilde{t})$, where $\tilde{A}$ is the amplitude of the time-delayed peak in the TX cross correlation 305.

The TX cross-correlation $K_{TX}(\theta)$ 305 can then be used to identify and iteratively eliminate consecutive peaks in the RX cross-correlation $K_{RX}(\theta)$ 303. In some implementations, at first, the strongest peak (e.g., the internal retro-reflection peak $A_0\cdot S(\theta-\tau_0)$) in RX cross-correlation $K_{RX}(\theta)$ 303 can be matched with the peak $\tilde{A}\cdot S(\theta-\tilde{t})$ in TX cross-correlation $K_{TX}(\theta)$ 305. More specifically delay/rescaling/phase shift module 306 can identify the time delay $\Delta\tau_0$, the rescaling factor (relative strength) $R_0$, and the relative phase shift $\Delta\phi_0$ between the two peaks, $$\Delta\tau_0 = \tau_0 - \tilde{\tau},\ R_0\cdot e^{i\Delta\phi_0} = A_0\cdot\tilde{A}^{-1}.$$

A peak cancelation module 308 can then eliminate the internal retro-reflection peak from RX cross-correlation 303, which can be performed as follows, e.g., by imparting the time delay $\Delta\tau_0$, rescaling by factor $R_0$, and phase shifting by the phase shift $\Delta\phi_0$ $$K_{RX}(\theta) \to K'_{RX}(\theta) = K_{RX}(\theta) - K_{TX}(\theta-\Delta\tau_0)\cdot R_0\cdot e^{i\Delta\phi_0}.$$

The residual RX cross-correlation $K'_{RX}(\theta)$ can then be used in additional iterations. In particular, the next iteration 310 can identify the strongest peak in the residual RX cross-correlation $K'_{RX}(\theta)$ (e.g., a peak corresponding to a reflection from the closest outside object), determine the peak's delay time $\Delta\tau_1$, rescaling factor $R_1$, and phase shift $\Delta\phi_1$ relative to the peak $\tilde{A}\cdot S(\theta-\tilde{t})$ in TX cross-correlation $K_{TX}(\theta)$ 305. IRP 124 can then eliminate the peak from the residual RX cross-correlation, e.g., by computing the difference, $$K'_{RX}(\theta) \to K''_{RX}(\theta) = K'_{RX}(\theta) - K_{TX}(\theta - \Delta\tau_1) \cdot R_1 \cdot e^{i\Delta\phi_1}.$$

As indicated with ellipses in FIG. 3, this iterative process of identifying consecutive delay time $\Delta\tau_l$, rescaling factor $R_l$, and phase shift $\Delta\phi_l$ can continue for any additional reflection peaks that can be present in RX cross-correlation 303. As a result, IRP 124 identifies distances (based on respective delay times $\Delta\tau_l$) to various objects located along the optical path of RX beam 264.

The distances to various objects 262 can then computed as $L_l = c\tau_l/2$. The radial velocities of objects 262 can be determined as $V = cf_D/(2f_2)$, based on the respective Doppler shifts $f_D$ of the beating patterns formed by the portions of RX beam 264 reflected from the corresponding objects, e.g., between Doppler-shifted pilot tone frequency $f_2 \to f_2 + f_D$ and the frequency $f_0$ of LO beam 214.

The advantages of the disclosed implementations include (but are not limited to) efficient elimination (or substantial reduction) of internal retro-reflections from phase information of received beams. In particular, the precise strength, delay time, and phase shift of the internal retro-reflection contribution can vary with changing environmental conditions (e.g., temperature, humidity, and the like) and further undergo long-time changes as various optical components of the optical sensing system age, using strength/delay/phase shift determined during manufacturing calibration can be inaccurate. The disclosed techniques allow efficient elimination (or substantial reduction) of internal retro-reflections under all such conditions, by taking advantage of the contemporaneous information obtained using the copy of the TX beam.

DSP 290 can include spectral analyzers, such as Fast Fourier Transform (FFT) analyzers, cross-correlators, and other circuits configured to process digital signals, including central processing units (CPUs), graphic processing units (GPUs), tensor processing units (TPUs), field-programmable gate arrays (FPGAs), application-specific integrated circuits (ASICs), etc., and memory devices. In some implementations, the processing and memory circuits can be implemented as part of a microcontroller.

Figure 4:
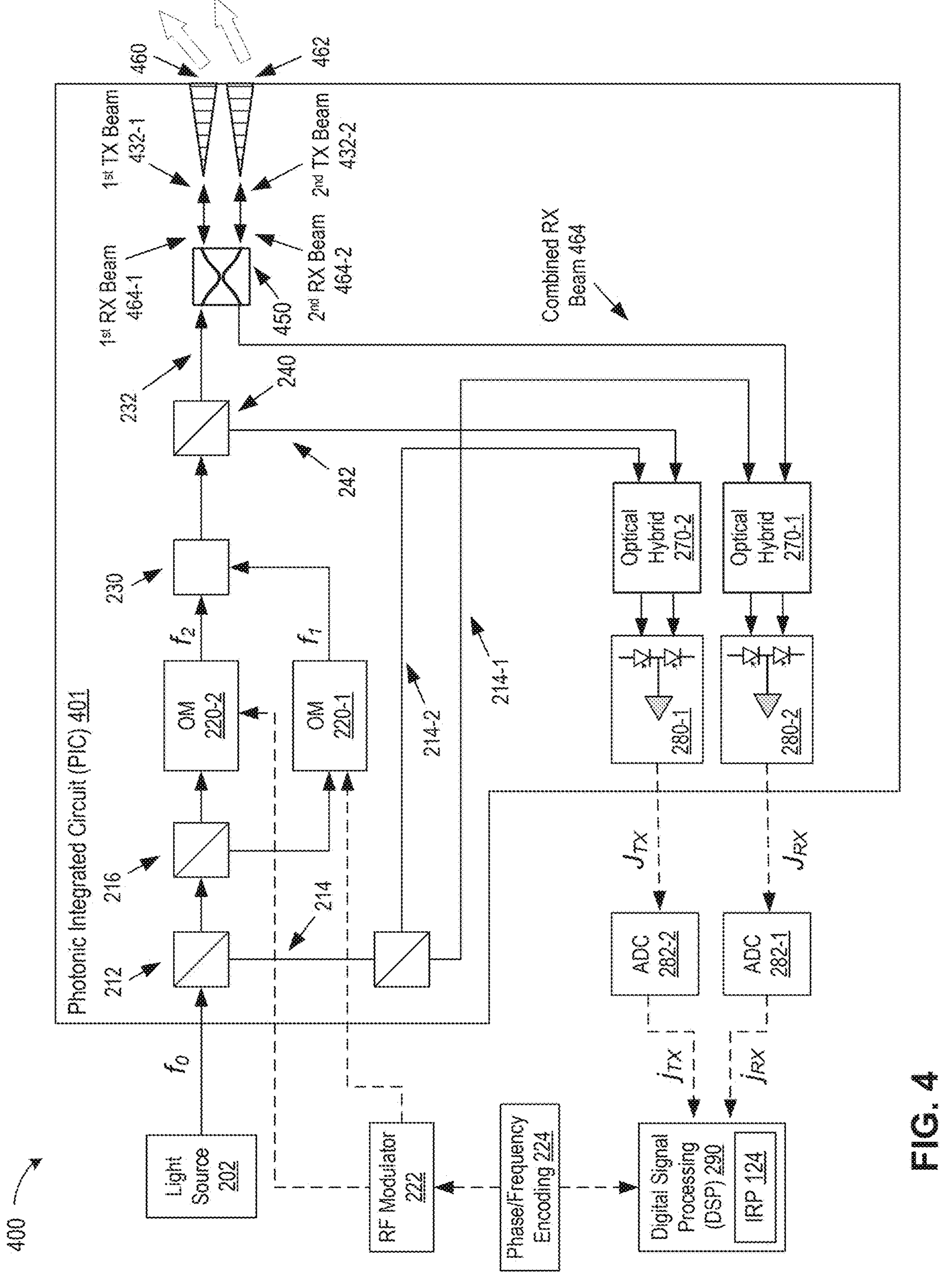
FIG. 4 is a block diagram illustrating an example optical sensing system implemented as part of a photonic integrated circuit and capable of iterative processing of reflections from multiple objects, in accordance with some implementations of the present disclosure.

FIG. 4 is a block diagram illustrating an example optical sensing system 400 implemented as part of a photonic integrated circuit (PIC) and capable of iterative processing of reflections from multiple objects, in accordance with some implementations of the present disclosure. A light source 202 can produce a beam of light, which can be further conditioned and preprocessed by a beam preparation stage (not shown for brevity), e.g., as described above in conjunction with FIG. 2. In some implementations, the light can be delivered, e.g., via optical fiber or free space, to a PIC 401 for further processing. In some implementations, light source 202 can be a light source (e.g., semiconducting laser, and laser diode) that is integrated on PIC 401. PIC 401 can perform multiple passive and active optical functions to create one or more signals with desired amplitude, phase, spectral, and polarization characteristics. PIC 401 can include a number of waveguides, beam splitters, couplers, light switches, phase shifters, optical amplifiers, diffraction gratings, grating couplers, photodiodes, and other optical elements. A beam produced by light source 202 can be received by PIC 401 using one or more directional switches that direct the incoming light within a plane of the chip to a beam splitter 212, e.g., over a silicon (Si) single-mode or multi-mode waveguide(s). Beam splitter 212 can be a one-to-two power splitter, or any other suitable splitter. Various other components of PIC 401 that have the same numerals as the corresponding components of the sensing system 200 of FIG. 2 can have the same or a similar functionality.

Beam splitter 240 can output TX beam 232 and a copy of TX beam 242. TX beam 232 can be delivered to a directional coupler 450 that splits TX beam 232 into multiple beams. Directional coupler 450 can receive the light on the coupler's input port and transmit a portion of the received light to an output port to produce a first TX beam 432-1. The remaining light is outputted by the coupled port of directional coupler 450 to generate a second TX beam 432-2. The fourth (isolated) port of directional coupler 450 can leak no or very little light. In some implementations, the power of the first TX beam 432-1 and the second TX beam 432-2 can be the same (or approximately the same). The first TX beam 432-1 and the second TX beam 432-2 can be delivered to a respective first interface coupler 460 and second interface coupler 462. In some implementations, the interface couplers 460 and 462 can be grating couplers or any other suitable directional switches configured to direct TX beams **432-*n* along the desired direction or several different directions in space. Each interface coupler can implement a different sensing pixel corresponding to a respective spatial direction probed by optical sensing system 400. In some implementations, interface couplers 460 and 462 can direct the first TX beam 432-1 and the second TX beam 432-2** towards any suitable collimating lenses, polarizers, and other optical elements.

The transmitted beams can interact with an object or multiple objects in the outside environment and generate reflected beams that can propagate back towards the optical sensing system 400. The reflected beams can be received through the same interface couplers 460 and 462 and propagate towards the directional coupler 450 as part of a first RX beam 464-1 and a second RX beam 464-2. Each of the RX beams **464-*n* can include (in addition to the light reflected from the object(s) in the environment) a light retro-reflected from various optical components of PIC 401, including any portion of interface couplers 460 and 462 (e.g., light retro-reflected from diffraction gratings), waveguide openings, collimator lenses, and/or any other intervening optical elements. Directional coupler 450 can pass a portion (e.g., one-half) of each of the RX beams to the port that outputs a combined RX beam 464. The combined RX beam 464 can be processed together with the first copy of LO beam 214-1 by optical hybrid stage 270-1 and coherent detection stage 280-1, as described above in conjunction with FIG. 2. Similarly, the copy of TX beam 242 can be processed together with the second copy of LO beam 214-2 using optical hybrid stage 270-2 and coherent detection stage 280-2. Digital iterative processing of reflections from multiple objects (including internal retro-reflections) can then be performed using ADC 282-1, ADC 282-2, and DSP 290, e.g., substantially as described above in conjunction with FIG. 3. Although FIG. 4 illustrates two interface couplers 460 and 462, any number of interface couplers delivering the respective number of TX beams 432-*n*** to the environment and receiving the respective number of RX beams from the environment can be processed using the disclosed techniques.

Figure 5:
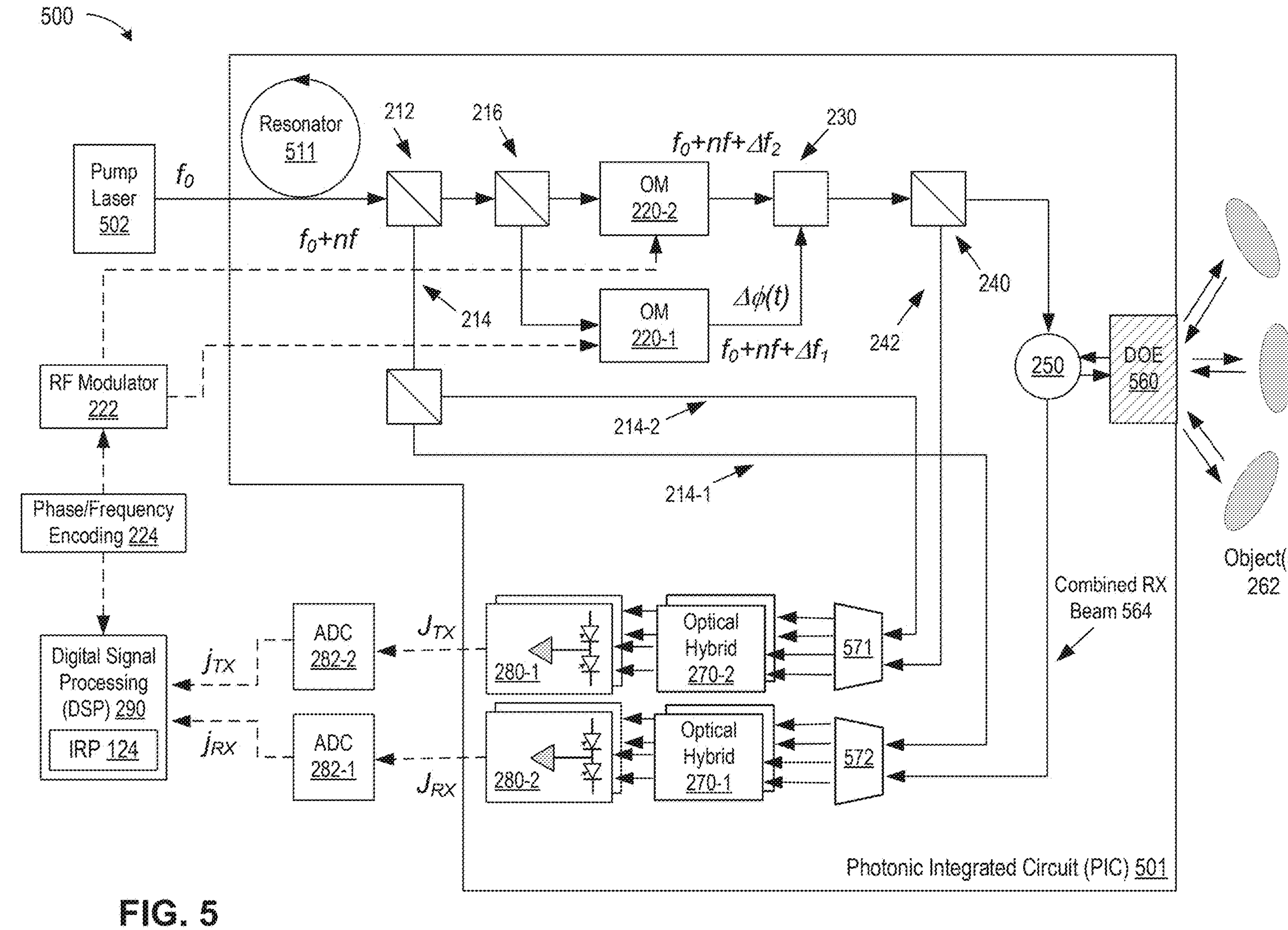
FIG. 5 is a block diagram illustrating an example optical sensing system that uses frequency multiplexing and is capable of iterative processing of reflections from multiple objects, in accordance with some implementations of the present disclosure.

FIG. 5 is a block diagram illustrating an example optical sensing system 500 that uses frequency multiplexing and is capable of iterative processing of reflections from multiple objects, in accordance with some implementations of the present disclosure. In some implementations, multiple elements of optical sensing system 500 can be mounted on a PIC 501. In some implementations, optical sensing system 500 does not include a PIC. In some implementations, some elements of optical sensing system 500 can be mounted on a PIC while other elements can be located outside the PIC. In some implementations, light can be delivered between any elements of optical sensing system 500 via optical fibers or free space. In some implementations, optical sensing system 500 can include a light source, e.g., a pump laser 502, that generates pump light of frequency $f_0$. The pump light can be used to excite resonance modes (e.g., whispering-gallery modes) in a resonator 511 that produces a frequency comb of equally spaced frequencies $f_0+nf$, where n is an integer and f is a comb spacing determined by a resonant mode frequency of resonator 511, e.g., the inverse time of light travel around resonator 511. The comb spacing f can be between hundreds of Megahertz or less to hundreds of Gigahertz or more. As a result, the output of resonator 511 can be a sequence of pulses having the carrier frequency $f_0$ and the repetition times 1/f. The Fourier transform of such a sequence of pulses includes a set of sharp peaks at frequencies $f_0+nf$. Pump laser 502 can be a Ti:sapphire solid-state laser, an Er:fiber laser, Cr:LiSAF laser, and the like. Resonator 511 can be a microresonator made of Silicon Nitride, Aluminum Nitride, Quartz, Hydex, and the like.

Each of the comb peaks (or "teeth") can be modulated. More specifically, optical modulator 220-1 can impart a first offset frequency $\Delta f_1$ and a phase (frequency and/or amplitude) modulation $\Delta\phi(t)$ to a first set of comb peaks. Optical modulator 220-2 can impart a second offset frequency $f_2$ to a second set (copy) of comb peaks. In some implementations, one of the sets of comb peaks can be unshifted (e.g., no offset is applied to the second set of comb peaks, $f_2=0$). The two sets of the comb peaks can then be combined by optical combiner 230. The combined beam can be amplified by a suitable amplifier (not shown in FIG. 5 for conciseness) and transmitted towards multiple objects 262 using a dispersive optical element (DOE) 560 (e.g., a part of a TX/RX optical interface), which can be a prism, a diffraction grating, a dispersive crystal, or any other dispersive element configured to direct light of different frequencies along different optical paths. In some implementations, the number of different transmitted beams can be tens or even hundreds or more.

Multiple beams reflected from objects 262 can be received through DOE 560 and directed (e.g., by optical circulator 250) for coherent detection. Prior to undergoing coherent detection processing, a combined RX beam 564 (and the first LO copy 214-1) can be demultiplexed by optical demultiplexer 571. Similarly, a copy of TX beam 242 (and the second LO copy 214-2) can be demultiplexed by optical demultiplexer 572. Optical demultiplexers 571 and 572 can be or include one or more arrayed waveguide gratings (AWG), echelle gratings, Mach-Zehnder interferometer (MZI) lattice filters, or the like. Coherent detection processing can include multiple optical hybrid stages 270-1 (and/or multiple optical hybrid stages 270-2) as well as multiple coherent detection stages 280-1 (and/or multiple coherent detection stages 280-2), e.g., a separate optical hybrid and a coherent detection stage for each pair of demultiplexed beams. Digital iterative processing of reflections from multiple objects (including internal retro-reflections) can then be performed using ADC 282-1, ADC 282-2, and DSP 290, e.g., as described above in conjunction with FIG. 3.

Figure 6A:
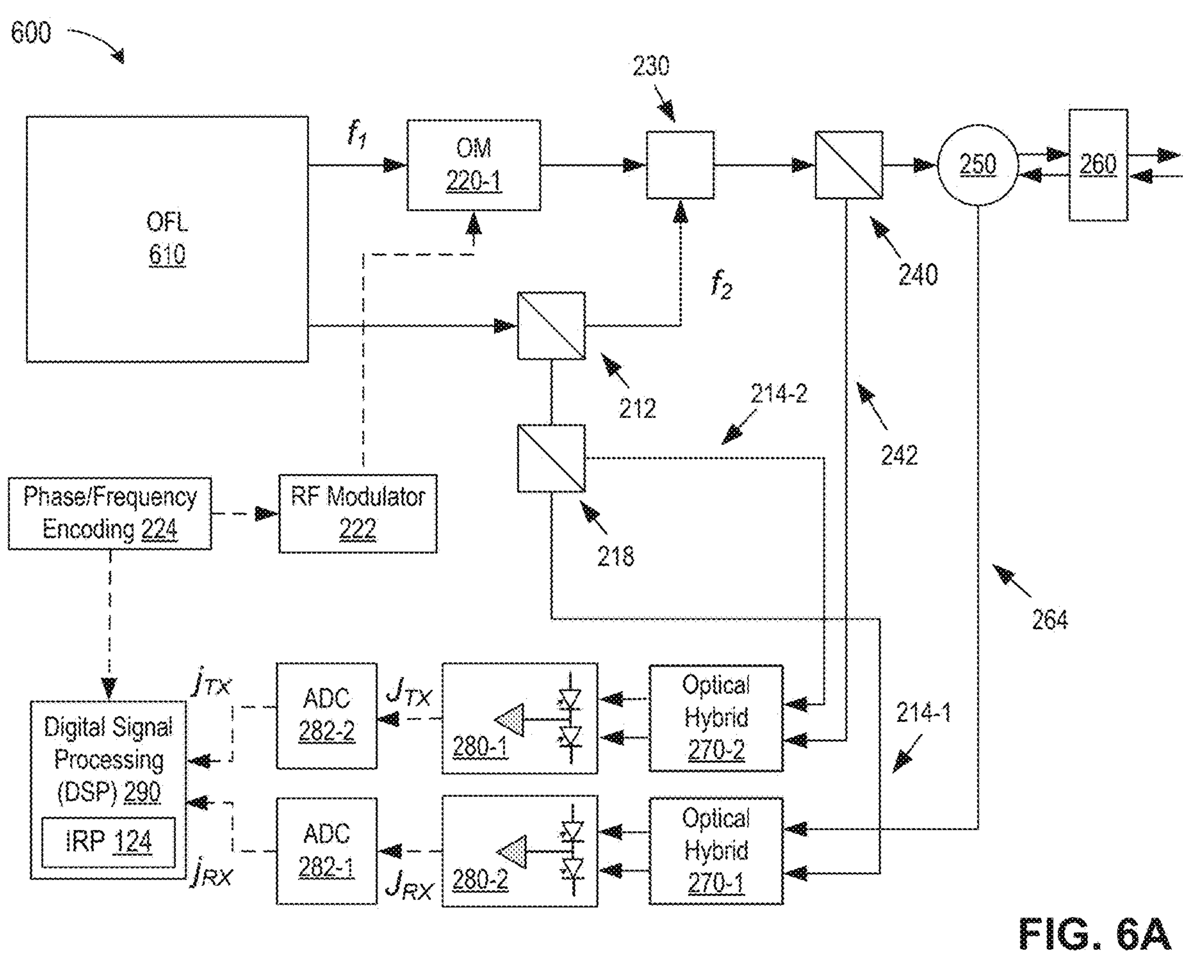
FIG. 6A is a block diagram illustrating an example optical sensing system that uses optical locking to enable frequency multiplexing and is capable of iterative processing of reflections from multiple objects, in accordance with some implementations of the present disclosure.
Figure 6B:
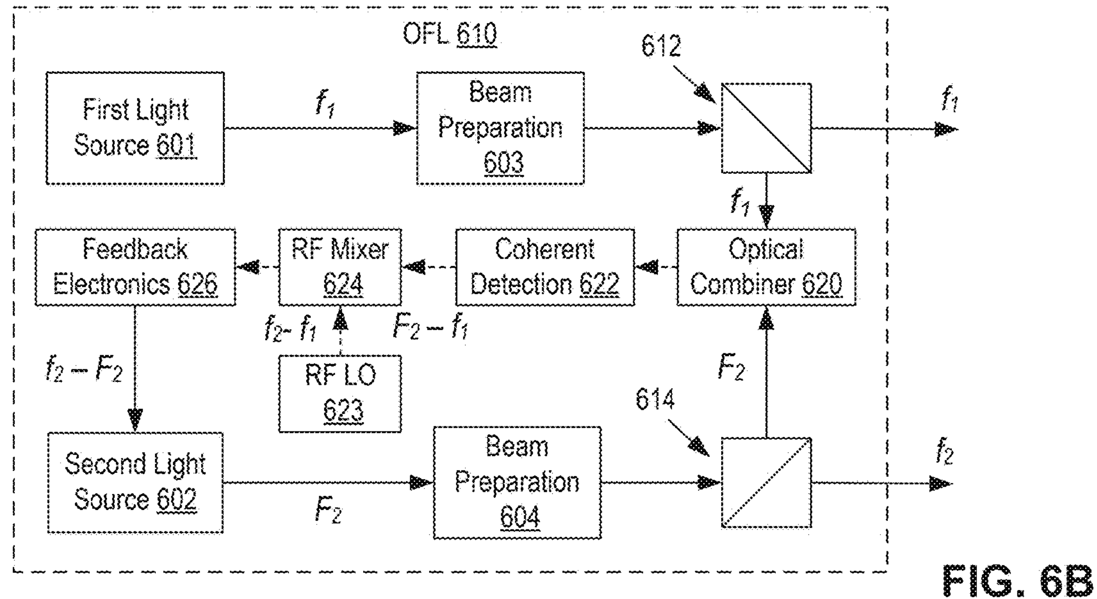
FIG. 6B illustrates an example optical feedback loop that can be used in the optical sensing system of FIG. 6A, in accordance with some implementations of the present disclosure.

FIG. 6A is a block diagram illustrating an example optical sensing system 600 that uses optical locking to enable frequency multiplexing and is capable of iterative processing of reflections from multiple objects, in accordance with some implementations of the present disclosure. FIG. 6B illustrates an example optical feedback loop (OFL) 610 that can be used in optical sensing system 600, in accordance with some implementations of the present disclosure. As illustrated, OFL 610 can include multiple sources of light, e.g., a first light source 601 and a second light source 602, configured to produce separate beams. Each of the first light source 601 and/or second light source 602 can include a semiconductor laser, a gas laser, an ND:YAG laser, or any other type of laser. Each of first light source 601 and/or second light source 602 can be a continuous wave laser, a single-pulse laser, a repetitively pulsed laser, a mode locked laser, and the like. The beams output by first light source 601 and/or second light source 602 can be pre-processed by respective beam preparation stages 603 and 604 to ensure narrow-band spectrum, target linewidth, coherence, polarization, and the like.

Second light source 602 can be an adjustable-frequency laser. OFL 610 can be used to lock a frequency of the beam output by second light source 602 to a predetermined offset frequency $f_2-f_1$ relative to the frequency $f_1$ of the first light source 601. OFL 610 can include a coherent detection stage 622, an RF local oscillator (RF LO) 623, an RF mixer 624, a feedback electronics stage 626, as well as various other devices, such as one or more beam splitters, combiners, filters, amplifiers, and the like. In some implementations, first light source 601 can output a first beam of light that has (fixed) frequency $f_0$. Second light source 602 can be configured to output a second beam of light with a target frequency $f_2$ that can be offset relative to $f_1$. Because it can be difficult to achieve the target frequency $f_2$ using static laser settings, second light source 602 can be set up to output light with frequency $F_2$ that can be close to the target frequency $f_2$ (so that $|F_2-f_2|<<f_2$) but need not be exactly equal to the target frequency $f_2$. The target frequency $f_2$ can be achieved via OFL 610 by fine-tuning the frequency offset from $F_2-f_1$ to $f_2-f_1$ and ensuring phase coherence of the outputs of second light source 602 and first light source 601, as described below.

In some implementations, a beam splitter 612 can direct a copy of the first beam (with frequency $f_1$) to optical combiner 620 that also receives a copy of the second beam (with frequency $F_2$) from a beam splitter 614. Optical combiner 620 can include an optical hybrid (e.g., a 180-degree hybrid or a 90-degree hybrid) that produces one or more beams representing a sum of the first beam, phase-shifted to 0 degrees, 90 degrees, 180 degrees, 270 degrees, and the like, and the second beam. (In some implementations, the second beam can be phase-shifted). The produced beams can be input into a coherent detection stage 622, which can include one or more photodiodes or phototransistors, e.g., arranged in a balanced photodetection setup that enables determining a phase difference between the first beam and the second beam. Prior to being inputted into coherent detection stage 622, any one (or both) of the input beams can be additionally processed (e.g., amplified) to have the same (or similar) amplitudes.

Coherent detection stage 622 can detect a difference between frequencies and phases of the input beams, e.g., between frequency $f_1$ of the first beam and frequency $F_2$ of the second beam. Coherent detection stage 622 can output an electrical signal (e.g., an RF electrical signal) having a beat pattern representative of the offset frequency $F_2-f_1$ and the relative phase difference between the first beam and the second beam. The electrical signal representative of the beat pattern can be provided to RF mixer 624. A second input into RF mixer 624 can be a signal from RF LO 623 (e.g., a synthesizer) that has the target offset frequency $f_2-f_1$. RF mixer 424 can produce a first RF signal of frequency $f_2-F_2$ and a second RF signal of frequency $f_2+F_2-2f_1$. A low-pass filter (not shown in FIG. 6) can filter out the second RF signal and provide the first RF signal representative of the frequency difference $f_2-F_2$ (and the relative phase between the first beam and the second beam) to feedback electronics stage 626. Feedback electronics stage 626 can operate in a frequency range that includes a low-frequency (e.g., dc and close to dc) domain but also extends above at least the linewidth of the second light source 602. In some implementations, the bandwidth at which feedback electronics stage 626 operates can be significantly higher than the linewidth of second light source 602, to improve line narrowing (or to prevent line broadening) during loop locking operations. For example, the bandwidth can be 1-10 MHz or even more (e.g., for the second light source 602 linewidth of 50-100 KHz). In some implementations, the bandwidth can be up to 50 MHz. Increasing the bandwidth can be cost-optimized against desired accuracy of the sensing system, with higher bandwidths acceptable in higher-accuracy sensing systems and lower bandwidths used in more economical devices that have a lower target accuracy.

Feedback electronics stage 626 can determine the frequency of the input signal, $f_2-F_2$ and can modify settings of second light source 602 to minimize $f_2-F_2$. For example, feedback electronics stage 626 can determine—by adjusting settings of second light source 602 and detecting a corresponding change in the frequency of the output of RF mixer 624—that increasing (decreasing) frequency $F_2$ of second light source 402 reduces (enhances) the frequency mismatch $|f_2-F_2|$ whereas decreasing (increasing) frequency of second light source 402 enhances (reduces) the frequency mismatch $|f_2-F_2|$. Feedback electronics stage 626 can then change the settings of second light source 402, e.g., move frequency f in the direction that decreases the frequency mismatch $|f_2-F_2|$. This procedure can be repeated iteratively (e.g., continuously or quasi-continuously) until the mismatch $|f_2-F_2|$ is minimized and/or brought within an acceptable (e.g., target) accuracy.

Similarly to how the frequency difference is minimized, RF mixer 624, RF LO 623, and feedback electronics stage 626 can be used to correct for the phase difference between the first beam output by first light source 601 and the second beam output by second light source 602. In some implementations, one or more filters (not shown in FIG. 6) can filter out high frequency phase fluctuations while selecting, for processing by feedback electronics stage 626, those fluctuations whose frequency is of the order of (or higher, up to a certain predefined range, than) the linewidth of second light source 602. For example, the linewidth can be below 50-100 KHz whereas filter(s) bandwidth can be of the order of 1 MHz.

OFL 610 can include additional elements that are not explicitly depicted in FIG. 6. For example, OFL 610 can include one or more electronic amplifiers, which can amplify outputs of at least some of coherent detection stage 622, RF mixer 624, filter(s), and so on. In some implementations, feedback electronics stage 626 can include an ADC with some components of feedback electronics stage 626 implemented as digital processing components. Feedback electronics stage 626 can include circuitry capable of adjusting various settings of second light source 602, such as parameters of optical elements (mirrors, diffraction gratings), including grating periods, angles, refractive indices, lengths of optical paths, relative orientations of optical elements, and the like. Feedback electronics stage 626 can be capable of tuning the amount of current injected into elements of second light source 602 to control temperature, charge carrier density, and other parameters responsible for control of the frequency and phase of light output by second light source 602.

With the synchronization of first light source 601 and second light source 602 enabled by OFL 610, second light source 602 operates in a mode that is frequency-offset and phase-locked relative to first light source 601. Correspondingly, a second copy of the second beam (output by beam splitter 612) can be used to carry frequency (and/or phase) encoding transmitted to one or more target, e.g., imparted by optical modulator 220-1 (using RF modulator 222), as indicated in FIG. 6A. Similarly, a second copy of the second beam (output by beam splitter 614) can be used as an unmodulated part (pilot tone). In some implementations, modulation can be applied to the copy of the second beam (e.g., using an optical modulator that is similar to an optical modulator 220-2 in FIG. 2) and not to the copy of the first beam. In some implementations, modulation can be applied both to the copy of the second beam and to the copy of the first beam.

In some implementations, more than two lasers can be used in a way that is similar to the setup of FIG. 6. For example, an N-laser system can be used with one laser deployed as a LO laser and N−1 lasers deployed as signal lasers, each of the signal lasers having a different offset from the LO laser frequency and being optically locked to the LO laser (or one of the other N−1 signal lasers) as described above.

Identification of multiple reflections, including internal retro-reflections, can be performed as described above, e.g., in conjunction with FIG. 2 and FIG. 3. More specifically RX beam 264 can be processed together with the first copy of LO beam 214-1 by optical hybrid stage 270-1 and coherent detection stage 280-1. Similarly, the copy of TX beam 242 can be processed together with the second copy of LO beam 214-2 using optical hybrid stage 270-2 and coherent detection stage 280-2. Digital iterative processing of reflections from multiple objects (including internal retro-reflections) can then be performed using ADC 282-1, ADC 282-2, and DSP 290, e.g., as described above in conjunction with FIG. 3.

In some implementations, multiple elements of optical sensing system 600 can be manufactured on a PIC. In some implementations, some elements of optical sensing system 600 can be manufactured on a PIC while other elements can be located outside the PIC. Optical sensing systems 400, 500, and/or 600 can perform detection of distances and velocities in a manner that is similar to how such a detection is performed by optical sensing system 200 of FIG. 2, e.g., using the pilot tone signal (in the instances of phase modulation) and/or a sequence of frequency chirps (in the instances of frequency modulation).

PICs deployed in various optical sensing systems disclosed herein (or other similar sensing systems) can be implemented on a single chip (substrate), e.g., Silicon chip, Silicon Oxide chip, Indium Phosphide chip, Silicon Nitride chips, diamond-based chips, and the like, and can integrate multiple optical elements and functions. PICs can be manufactured using multiple materials, e.g., III-V compound semiconductors (GaAs, InSb, etc.) integrated with Silicon or Germanium. The chip can be manufactured using any suitable methods of lithography, epitaxy, physical vapor deposition, chemical vapor deposition, plasma-assisted deposition, or any other suitable techniques of wafer-scale technology. PICs can operate in the visible light domain (300-700 nm wavelength) or in the infrared domain (above 1000 nm). PICs can include components designed and manufactured to generate light, guide light, manipulate light by changing amplitude, frequency, phase, polarization, spatial and temporal extent of light, transform energy of light into other forms, such as energy of electric current, energy of mechanical vibrations, heat and the like.

PICs can include any number of integrated light sources, such as light-emitting diodes (LEDs), semiconductor lasers diodes, quantum dot lasers (e.g., quantum dot lasers monolithically grown on Silicon), Germanium-on-Silicon lasers, Erbium-based lasers, Raman lasers, integrated III-V compound semiconductors on Si substrate, and the like. In some implementations, PICs can operate on light generated by lasers and other light sources located off-chip and delivered to PICs via any number of optical switches and optical fibers.

PICs can include any number of waveguides, which can serve as elemental building blocks of a PIC's light transportation system, connecting various elements and components. Waveguides can include metallic waveguides, dielectric waveguides, doped semiconductor waveguides, and the like. Waveguides can be single-mode waveguides or multimode waveguides. Waveguides can be passive waveguides or active waveguides with gain medium, which can increase the amplitude of the light guided therethrough. Dielectric waveguides can be engineered with high refractive index layers surrounded by lower refractive index materials, which can be deposited and shaped to a designed form using deposition and etching manufacturing techniques.

PICs can include any number of beam splitters, e.g., power splitters, beam combiners, directional couplers, grating couplers, and the like. PICs can include optical circulators, e.g., Faraday effect-based circulators, birefringent crystal-based circulators, and so on. PICs can include any number of optical amplifiers, such as Erbium-doped amplifiers, waveguide-integrated amplifiers, saturation amplifiers, and the like. PICs can further include any number of phase shifters, such as optomechanical phase shifters, electro-optical phase shifters, e.g., shifters operating by exercising electrical or mechanical control of the refractive index of an optical medium, and the like.

PICs can include any number of optical modulators, including indium phosphide modulators, Lithium Niobate modulators, Silicon-based modulators, acousto-optic modulators, electro-optic modulators, electro-absorption modulators, Mach-Zehnder modulators, and the like. In some implementations, optical modulators can use carrier injection, radiation amplification, and other techniques. Optical modulators can include various optomechanical components, e.g., components that modulate the refractive index of a waveguide due to the displacement of a mechanically moveable part placed next to the waveguide, which in turn induces a phase shift (or a directional shift) to the propagating light field.

PICs can include any number of single-photon detectors, e.g., superconducting nanowire single-photon detectors (SNSPDs) or superconducting film single-photon detectors, which can be integrated with diamond or silicon substrates. PICs can include any number of interferometers, such as Mach-Zehnder interferometers.

PICs can include any number of multiplexers/demultiplexers, including wavelength division multiplexers/demultiplexers, phased-array wavelength multiplexers/demultiplexers, wavelength converters, time division multiplexers/demultiplexers, and the like.

PICs can further include any number of photodetectors, including silicon photomultipliers, photodiodes, which can be Silicon-based photodiodes, Germanium-based photodiodes, Germanium-on-Silicon-based photodiodes, III-V semiconductor-based (e.g., GaAs-based) photodiodes, avalanche photodiodes, silicon photomultipliers (SiPMs), and so on. Photodiodes can be integrated into balanced photodetector modules, which can further include various optical hybrids, e.g., 90-degree hybrids, 180-degree hybrids, and the like.

Figure 7:
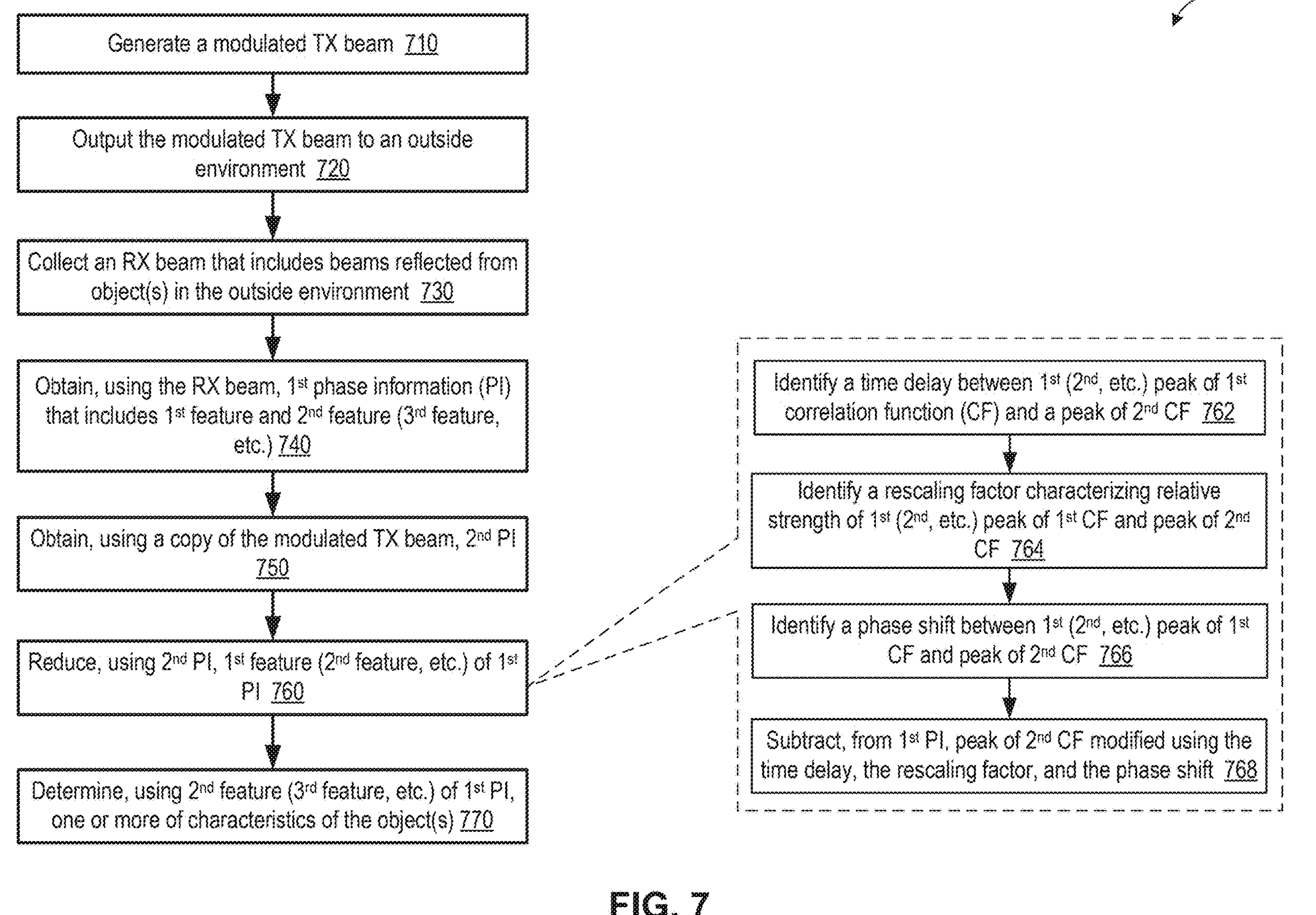
FIG. 7 depicts a flow diagram of an example method of iterative processing of reflections from multiple objects, including identification and reduction of internal retro-reflections, in accordance with some implementations of the present disclosure.

FIG. 7 depicts a flow diagram of an example method 700 of iterative processing of reflections from multiple objects, including identification and reduction of internal retro-reflections, in accordance with some implementations of the present disclosure. Method 700 can be performed using systems and components described in relation to FIGS. 1-5, e.g., optical sensing system 200 of FIG. 2, optical sensing system 400 of FIG. 4, optical sensing system 500 of FIG. 5, optical sensing system 600 of FIG. 6, and/or various modifications or combinations of the aforementioned sensing systems, which can be implemented, e.g., as part of a lidar apparatus. Method 700 can be performed in the course of obtaining range and velocity data that characterizes any suitable environment, e.g., an outside environment of a moving vehicle, including but not limited to an autonomous vehicle. Various operations of method 700 can be performed in a different order compared with the order shown in FIG. 7. Some operations of method 700 can be performed concurrently with other operations. In some implementations, some operations of method 700 are not always performed. Method 700 can be used to improve efficiency and reliability of velocity and distance detections by lidar devices.

Method 700 can include generating, at block 710, a modulated transmitted (TX) beam. In some implementations, generating the TX beam can include, with reference to FIG. 2, producing a light beam using light source 202, conditioning the light beam using beam preparation stage 210, modulating the light beam using optical modulator 220-1 and/or optical modulator 220-2, amplifying the light beam, and/or performing other operations. It should be understood, as disclosed in conjunction with FIG. 2, that the modulated TX beam can include multiple beam components, some of which can be unmodulated. For example, TX beam 232 can include a modulated portion (with frequency $f_1$) and an unmodulated (pilot tone) portion (with frequency $f_2$). In some implementations, the modulated TX beam can be modulated (encoded) using a sequence of shifts, e.g., a sequence of phase shifts or a sequence of frequency shifts. The sequence of shifts can be characterized by an autocorrelation function (e.g., $K_{MOD}(\theta)$, as described in conjunction with FIG. 3) that is a peaked function of a time delay (offset), e.g., a sharp maximum at a particular delay time (e.g., zero delay time modulo a period of encoding) significantly exceeding a noise floor. In some implementations, the sequence of shifts can be based on a maximum-length sequence, a Gold code, or a Barker code.

At block 720, method 700 can include outputting the modulated TX beam to an outside environment. In some implementations, outputting the modulated TX beam can include using optical circulator 250 and TX/RX optical interface 260, as illustrated in FIG. 2. In some implementations, outputting the modulated TX beam can include using directional coupler 450 and one or more interface couplers 460, 462, as illustrated in FIG. 4.

At block 730, method 700 can continue with collecting a received (RX) beam. In some implementations, the RX beam can be collected through the same optical interface that outputs the TX beam (e.g., TX/RX optical interface 260, interface couplers 460, 462, and/or the like). The RX beam can include one or more reflected beams caused by interaction of the modulated TX beam with a respective object of one or more objects in the outside environment. The RX beam can include one or more beams retro-reflected from various internal elements, components, and/or junctions of various elements that are internal to the optical system.

At block 740, method 700 can include obtaining, using the RX beam, a first phase information (PI). For example, the first PI can be extracted from the RX beam using some or all of optical hybrid stage 270-1, coherent detection stage 280-1, ADC 282-1, and/or DSP 290. In some implementations, the first PI can be represented by an analog electrical current $J_{RX}$ outputted by coherent detection stage 280-1 and/or a digital signal $j_{RX}$ outputted by ADC 282-1 (e.g., as described in conjunction with FIG. 1). The first PI can include a first feature, a second feature, a third feature, and so on. In some implementations, the first feature can be associated with an internal, to the optical system, retro-reflection of the TX beam. In some implementations, the second (third, etc.) feature of the first PI can be associated with an object (multiple objects) in the outside environment. For example, the first feature can include a first peak of a first correlation function (CF) (e.g., cross-correlator $K_{RX}(\theta)$, as described in conjunction with FIG. 3), which can characterize correlation between the first PI and the sequence of shifts. Similarly, the second (third, etc.) feature can include a second (third, etc.) peak of the first CF.

At block 750, method 700 can include obtaining, using a copy of the modulated TX beam, a second PI. For example, the second PI can be extracted from the TX beam using some or all of optical hybrid stage 270-2, coherent detection stage 280-2, ADC 282-2, and/or DSP 290. In some implementations, the second PI can be represented by an analog electrical current $J_{TX}$ outputted by coherent detection stage 280-2 and/or a digital signal $j_{TX}$ outputted by ADC 282-2 (e.g., as described in conjunction with FIG. 1). The second PI can include information about the modulation imparted to the TX beam.

At block 760, method 700 can continue with reducing (e.g., partially, substantially, or completely eliminating) the first feature of the first PI using the second PI. In some implementations, reducing the first (second, etc.) feature can be performed using operations illustrated in the callout portion of FIG. 7. More specifically, at block 762, method 700 can include identifying a time delay between the first peak and a peak of a second CF. The second CF (e.g., cross-correlator $K_{TX}(\theta)$, as described in conjunction with FIG. 3) can characterize correlation between the second PI and the sequence of shifts. At block 764, method 700 can include identifying a rescaling factor characterizing a relative strength of the first peak and the peak of the second CF. At block 766, method 700 can include identifying a phase shift between the first peak and the peak of the second CF. At block 768, method 700 can include subtracting, from the first PI, the peak of the second CF modified using the time delay and the rescaling factor.

At block 770, method 700 can continue with determining, using the second feature of the first PI, one or more characteristics of a first object of the one or more objects. The one or more characteristics of the first object can include a distance to the first object and/or a speed of the first object.

The operations of blocks 760-770 can be repeated iteratively for multiple features of the first PI. For example, in a repeat of block 760, method 700 can include reducing, using the second PI, the second (third, etc.) feature of the first PI. In some implementations, the repeat of block 760 can include some or all operations of blocks 762-768. Similarly, in a repeat of block 770, method 700 can include determining, using the third feature of the first PI, one or more of characteristics of (e.g., distance to and/or speed of) a second (third, etc.) object of the one or more objects.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it can prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:

an optical system configured to:

generate a local oscillator (LO) beam;

process the LO beam using one or more optical elements of the optical system to generate a transmitted (TX) beam;

output the TX beam to an outside environment; and collect a received (RX) beam comprising one or more reflected beams caused by interaction of the TX beam with at least one object in the outside environment; and one or more circuits configured to:

obtain a first phase information (PI) signal characterizing a first temporal correlation between the RX beam and the LO beam, wherein the first PI signal comprises a first feature and a second feature;

obtain, a second PI signal characterizing a second temporal correlation between a copy of the LO beam and a copy of the TX beam;

reduce, using the second PI signal, a degree of presence of the first feature in the first PI signal to obtain a reduced first PI signal; and determine, using the second feature of the reduced first PI signal, one or more characteristics of a first object in the outside environment.

2. The system of claim 1, wherein the first feature is associated with an internal, to the optical system, retro-reflection of the TX beam.

3. The system of claim 2, wherein the first PI signal further comprises a third feature, and wherein the one or more circuits are further configured to:

further reduce, using the second PI signal, a degree of presence of the second feature in the reduced first PI signal; and determine, using the third feature of the reduced first PI signal, one or more of characteristics of a second object in the outside environment.

4. The system of claim 1, wherein the TX beam is modulated using a sequence of shifts characterized by an autocorrelation function that is a peaked function of a time offset, and wherein the sequence of shifts comprises at least one of a sequence of phase shifts or a sequence of frequency shifts.

5. The system of claim 4, wherein the sequence of shifts is based on at least one of a maximum-length sequence, a Gold code, or a Barker code.

6. The system of claim 4, wherein the first feature comprises a first peak of a first correlation function (CF) and wherein the second feature comprises a second peak of the first CF, wherein the first CF characterizes correlation between the first PI signal and the sequence of shifts.

7. The system of claim 6, wherein to reduce the degree of presence of the first feature in the first PI signal, the one or more circuits are configured to:

identify a time delay between the first peak and a peak of a second CF, wherein the second CF characterizes correlation between the second PI signal and the sequence of shifts;

identify a rescaling factor characterizing a relative strength of the first peak and the peak of the second CF;

identify a phase shift between the first peak and the peak of the second CF; and subtract, from the first PI signal, the peak of the second CF modified using the time delay, the rescaling factor, and the phase shift.

8. The system of claim 1, wherein one or more components of the optical system are implemented on a photonic integrated circuit (PIC).

9. The system of claim 1, wherein the one or more characteristics of the first object comprise at least one of a distance to the first object or a speed of the first object.

10. A lidar apparatus comprising:

a photonic integrated circuit (PIC) comprising:

a light source configured to generate a light beam;

a modulator configured to impart a modulation to the light beam to obtain a modulated beam;

an optical coupler configured to produce, using the modulated beam, a transmitted (TX) beam and a copy of the TX beam; and an optical interface configured to output the TX beam to an outside environment and to collect a received (RX) beam, wherein the RX beam comprises:

one or more reflected beams caused by interaction of the TX beam with at least one object in the outside environment, and a retro-reflected beam caused by an internal, to the lidar apparatus, reflection of the TX beam; and one or more circuits configured to:

obtain a first phase information (PI) signal characterizing a first temporal correlation between the RX beam and at least one of the light beam or the modulated beam, wherein the first PI signal comprises a first feature representative of the retro-reflected beam and a second feature representative of the one or more reflected beams;

obtain a second PI signal characterizing a second temporal correlation between a copy of at least the light beam or the modulated beam and the copy of the TX beam;

reduce, using the second PI signal, a degree of presence of the first feature in the first PI signal to obtain a reduced first PI signal; and determine, using the second feature of the reduced first PI signal, one or more of characteristics of a first object in the outside environment.

11. The lidar apparatus of claim 10, wherein the first PI signal further comprises a third feature, and wherein the one or more circuits are further configured to:

further reduce, using the second PI signal, a degree of presence of the second feature in the reduced first PI signal; and determine, using the third feature of the reduced first PI signal, one or more of characteristics of a second object in the outside environment.

12. The lidar apparatus of claim 10, wherein the modulation comprises a sequence of shifts characterized by an autocorrelation function that is a peaked function of a time delay, wherein the sequence of shifts comprises at least one of a sequence of phase shifts or a sequence of frequency shifts.

13. The lidar apparatus of claim 12, wherein the first feature comprises a first peak of a correlation function of the first PI signal and the sequence of shifts and the second feature comprises a second peak of the correlation function of the first PI signal and the sequence of shifts, and wherein to reduce the degree of presence of the first feature in the first PI signal, the one or more circuits are further configured to:

identify a time delay between the first peak and a peak in the autocorrelation function;

identify a rescaling factor characterizing a relative strength of the first peak compared with the peak in the autocorrelation function; and subtract, from the first PI signal, the peak in the autocorrelation function modified using the time delay and the rescaling factor.

14. A method to operate a lidar device, the method comprising:

generating a local oscillator (LO) beam;

processing the LO beam using one or more optical elements to generate a transmitted (TX) beam;

outputting the TX beam to an outside environment;

detecting a received (RX) beam comprising one or more reflected beams caused by interaction of the TX beam with at least one object in the outside environment;

obtaining a first phase information (PI) signal characterizing a first temporal correlation between the RX beam and the LO beam, wherein the first PI signal comprises a first feature and a second feature;

obtaining a second PI signal characterizing a second temporal correlation between a copy of the LO beam and a copy of the TX beam;

reducing, using the second PI signal, a degree of presence of the first feature in the first PI signal to obtain a reduced first PI signal; and determining, using the second feature of the reduced first PI signal, one or more characteristics of a first object in the outside environment.

15. The method of claim 14, wherein the first feature is associated with an internal, to the lidar device, retro-reflection of the TX beam.

16. The method of claim 14, wherein the first PI signal further comprises a third feature, and wherein the method further comprises:

further reducing, using the second PI signal, a degree of presence of the second feature in the reduced first PI signal; and determining, using the third feature of the reduced first PI signal, one or more of characteristics of a second object in the outside environment.

17. The method of claim 14, wherein the TX beam is modulated using a sequence of shifts characterized by an autocorrelation function that is a peaked function of a time offset, and wherein the sequence of shifts comprises at least one of a sequence of phase shifts or a sequence of frequency shifts.

18. The method of claim 17, wherein the first feature comprises a first peak of a first correlation function (CF) and wherein the second feature comprises a second peak of the first CF, wherein the first CF characterizes correlation between the first PI signal and the sequence of shifts.

19. The method of claim 18, wherein reducing the degree of presence of the first feature in the first PI comprises:

identifying a time delay between the first peak and a peak of a second CF, wherein the second CF characterizes correlation between the second PI signal and the sequence of shifts;

identifying a rescaling factor characterizing a relative strength of the first peak and the peak of the second CF;

identifying a phase shift between the first peak and the peak of the second CF; and subtracting, from the first PI signal, the peak of the second CF modified using the time delay, the rescaling factor, and the phase shift.

20. The method of claim 19, wherein the one or more characteristics of the first object comprise at least one of a distance to the first object or a speed of the first object.

* * * * *